(12) United States Patent
Takabatake et al.

(10) Patent No.: US 7,474,636 B2
(45) Date of Patent: *Jan. 6, 2009

(54) DATA TRANSFER METHOD AND RADIO TERMINAL FOR EXECUTING TRANSPORT LAYER PROTOCOL ON RADIO NETWORK

(75) Inventors: Yoshiaki Takabatake, Kanagawa (JP); Ichiro Tomoda, Tokyo (JP); Yuzo Tamada, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 568 days.

This patent is subject to a terminal disclaimer.

(21) Appl. No.: 11/211,618

(22) Filed: Aug. 26, 2005

(65) Prior Publication Data

US 2005/0281211 A1 Dec. 22, 2005

Related U.S. Application Data

(62) Division of application No. 09/748,018, filed on Dec. 27, 2000, now Pat. No. 6,982,970.

(30) Foreign Application Priority Data

Dec. 27, 1999 (JP) ................................. 11-371760

(51) Int. Cl.
*H04B 7/212* (2006.01)
*H04L 12/28* (2006.01)

(52) U.S. Cl. ..................... 370/322; 370/431; 370/443

(58) Field of Classification Search ................ 370/322, 370/329, 341, 348, 395.31, 428, 431, 433, 370/443

See application file for complete search history.

(56) References Cited

U.S. PATENT DOCUMENTS 6,523,696 B1 2/2003 Saito et al.

FOREIGN PATENT DOCUMENTS

| EP | 0 848 568 | 6/1998 |
| WO | WO 99/29126 | 6/1999 |

OTHER PUBLICATIONS

A. Iera, et al., Global Telecommunications Conference-Globecom'99, vol. 1A, XP-010373275, pp. 69-73, "Supporting Multimedia With Soft-QOS Guarantee in Wireless Communication Systems", Dec. 5, 1999.

*Primary Examiner*—Chirag G Shah
*Assistant Examiner*—Ashley L Shivers
(74) *Attorney, Agent, or Firm*—Oblon, Spivak, McClelland, Maier & Neustadt, P.C.

(57) ABSTRACT

A scheme for realizing AV data transfer processing utilizing the transport layer protocol such as RTP protocol, between radio terminals in a radio system for carrying out data transfer after establishing a logical connection between radio terminals prior to data transfer between radio terminals such as Bluetooth is disclosed. In the case of transferring data packets containing an AV stream and exchanging control packets containing control information regarding transfer of the data packets, different logical channels are assigned to the data packets and the control packet so that the data packets and the control packet are transferred by these different logical channels.

23 Claims, 20 Drawing Sheets

FIG. 3

RADIO TERMINAL 101

| DESTINATION TERMINAL | MODE | DATA | STREAM | OWN TERMINAL SIDE CHANNEL | DESTINATION SIDE CHANNEL |
|---|---|---|---|---|---|
| [B] | TRANSMISSION | MPEG4 Video | RTP | CH_1 | CH_4 |
| | | MPEG4 Audio | RTP | CH_2 | CH_5 |
| | | Control | RTCP | CH_3 | CH_6 |
| .... | .... | | .... | .... | .... |

FIG. 4

RADIO TERMINAL 102

| DESTINATION TERMINAL | MODE | DATA | STREAM | OWN TERMINAL SIDE CHANNEL | DESTINATION SIDE CHANNEL |
|---|---|---|---|---|---|
| [A] | RECEPTION | MPEG4 Video | RTP | CH_4 | CH_1 |
| | | MPEG4 Audio | RTP | CH_5 | CH_2 |
| | | Control | RTCP | CH_6 | CH_3 |
| ... | ... | ... | ... | ... | ... |

FIG. 9

(a) PACKET [3] (Connection Request)

| Code=0x02 | Identifier | Length |
|---|---|---|
| PSM=RTP | | Source CID=2 |

(b) PACKET [4] (Connection Response)

| Code=0x03 | Identifier | Length |
|---|---|---|
| Destination CID=2 | | Source CID=5 |
| Result | | Status |

FIG. 10

(a) PACKET [5] (Connection Request)

| Code=0x02 | Identifier | Length |
| --- | --- | --- |
| PSM=RTCP | | Source CID=3 |

(b) PACKET [6] (Connection Response)

| Code=0x03 | Identifier | Length |
| --- | --- | --- |
| Destination CID=3 | | Source CID=6 |
| Result | | Status |

FIG. 15

(a) RADIO TERMINAL 201

| DESTINATION TERMINAL | MODE | DATA | STREAM | OWN TERMINAL SIDE CHANNEL | DESTINATION SIDE CHANNEL |
|---|---|---|---|---|---|
| [B] | TRANSMISSION | H.233 | RTP | CH_4 | CH_7 |
| | | Control | RTCP | CH_5 | CH_8 |
| ... | ... | ... | ... | ... | ... |

(b) RADIO TERMINAL 202

| DESTINATION TERMINAL | MODE | DATA | STREAM | OWN TERMINAL SIDE CHANNEL | DESTINATION SIDE CHANNEL |
|---|---|---|---|---|---|
| [A] | RECEPTION | H.233 | RTP | CH_7 | CH_4 |
| | | Control | RTCP | CH_8 | CH_5 |
| ... | ... | ... | ... | ... | ... |

DATA TRANSFER METHOD AND RADIO TERMINAL FOR EXECUTING TRANSPORT LAYER PROTOCOL ON RADIO NETWORK

CROSS-REFERENCE TO RELATED APPLICATIONS

This application is a divisional of U.S. patent application Ser. No. 09/748,018, filed Dec. 27, 2000, and claims priority to Japanese Patent Application No. 11-371760, filed Dec. 27, 1999. The contents of U.S. patent application Ser. No. 09/748,018 are incorporated herein by reference in their entirety.

BACKGROUND OF THE INVENTION

1. Field of the Invention

The present invention relates to a radio terminal belonging to a radio network for carrying out communications by setting up logical channels on a radio network in advance and an information transfer method of a radio terminal.

2. Description of the Background Art

In recent years, the realization of radio network (radio LAN) is attracting attention. In particular, since the determination of the IEEE 802.11 specification in 1998, many radio LAN products are appearing in the market and there has been a remarkable decrease in the prices of these radio LAN products.

In conjunction with this trend for improved performance and reduced cost of the radio technology, there is an active trend to consider applications of the radio technology to the home environment and this trend is expected to grow further in future as can be anticipated by establishment of organizations of related companies such as HomeRF and Bluetooth in the U.S.A. Also, from a viewpoint of the home network, the radio system is an easily acceptable system as it does not require any new cable construction. For this reason, a network system merging the IEEE 1394 bus and the fast and inexpensive radio LAN system is expected to play a central role in the future home network.

Also in conjunction with the spread of such radio networks, there is a trend to consider transfer of AV data through the radio networks, instead of conventional transfer of AV data through wired cables.

On the other hand, a realization of such an AV data transfer on the Internet is also in progress. On the Internet, applications such as RealMedia are already provided so that an environment in which a user can receive AV data through the Internet has been developed. A protocol called RTP (Realtime Transport Protocol) has been widely used as a transport layer protocol at a time of such an AV data transfer on the Internet. The RTP is a protocol for which the standardization by the IETF has already been completed and it is already the Standard-Track RFC 1889 (A Transport Protocol for Real-time Applications).

As mentioned above, currently there are many discussions of a scheme for realizing the AV data transfer using radio networks, but there has been no proposition for a mechanism to execute the transport layer protocol on a radio system of the above described type in order to realize the AV data transfer on the radio system.

SUMMARY OF THE INVENTION

It is therefore an object of the present invention to provide a radio terminal and a data transfer method capable of executing the transport layer protocol for the purpose of realizing AV data transfer in a radio system for carrying out data transfer after establishing a logical connection between radio terminals prior to data transfer between radio terminals.

It is another object of the present invention to provide a radio terminal and a data transfer method capable of executing the RTP protocol as the transport layer protocol for the purpose of realizing AV data transfer in a radio system for carrying out data transfer after establishing a logical connection between radio terminals prior to data transfer between radio terminals.

According to one aspect of the present invention there is provided a radio terminal device for use in a radio system for carrying out data transfer after establishing a logical connection between radio terminals prior to data transfer between radio terminals, the radio terminal device comprising: a logical channel set up unit configured to set up at least one first logical channel for transfer of data packets containing at least one AV stream and acquire information regarding at least one second logical channel set up for the transfer of the data packets at a correspondent radio terminal, and to set up at least one third logical channel for transfer of control packets containing control information regarding transfer of the data packets and acquire information regarding at least one fourth logical channel set up for the transfer of the control packets at the correspondent radio terminal; a memory unit configured to store a correspondence information including a correspondence between the first logical channel and the second logical channel for the AV stream, and a correspondence between the third logical channel and the fourth logical channel for the control information; and a packet transmission/reception unit configured to transmit/receive the data packets and the control packets to/from the correspondent radio terminal by using the correspondence information.

According to another aspect of the present invention there is provided a data transfer method in a radio system for carrying out data transfer after establishing a logical connection between radio terminals prior to data transfer between radio terminals, the method comprising the steps of: setting up at least one first logical channel for transfer of data packets containing at least one AV stream and acquiring information regarding at least one second logical channel set up for the transfer of the data packets at a correspondent radio terminal, and setting up at least one third logical channel for transfer of control packets containing control information regarding transfer of the data packets and acquiring information regarding at least one fourth logical channel set up for the transfer of the control packets at the correspondent radio terminal; storing a correspondence information including a correspondence between the first logical channel and the second logical channel for the AV stream, and a correspondence between the third logical channel and the fourth logical channel for the control information; and transmitting/receiving the data packets and the control packets to/from the correspondent radio terminal by using the correspondence information.

According to another aspect of the present invention there is provided a computer usable medium having computer readable program codes embodied therein for causing a computer to function as a radio terminal device for use in a radio system for carrying out data transfer after establishing a logical connection between radio terminals prior to data transfer between radio terminals, the computer readable program codes include: a first computer readable program code for causing said computer to set up at least one first logical channel for transfer of data packets containing at least one AV stream and acquire information regarding at least one second logical channel set up for the transfer of the data packets at a correspondent radio terminal, and to set up at least one third logical channel for transfer of control packets containing control information regarding transfer of the data packets and acquire information regarding at least one fourth logical channel set up for the transfer of the control packets at the correspondent radio terminal; a second computer readable program code for causing said computer to store a correspondence information including a correspondence between the first logical channel and the second logical channel for the AV stream, and a correspondence between the third logical channel and the fourth logical channel for the control information; and a third computer readable program code for causing said computer to transmit/receive the data packets and the control packets to/from the correspondent radio terminal by using the correspondence information.

Other features and advantages of the present invention will become apparent from the following description taken in conjunction with the accompanying drawings.

BRIEF DESCRIPTION OF THE DRAWINGS

FIG. 3 is a diagram showing an exemplary correspondence table of logical channels to be stored at one radio terminal according to the first embodiment of the present invention.

FIG. 4 is a diagram showing an exemplary correspondence table of logical channels to be stored at another radio terminal according to the first embodiment of the present invention.

FIG. 9 is a diagram showing exemplary header formats of next two packets to be transferred between radio terminals in the processing sequence of FIG. 5 and FIG. 6.

FIG. 10 is a diagram showing exemplary header formats of next two packets to be transferred between radio terminals in the processing sequence of FIG. 5 and FIG. 6.

FIG. 15 is a diagram showing exemplary correspondence tables of logical channels to be stored at radio terminals according to the second embodiment of the present invention.

DETAILED DESCRIPTION OF THE PREFERRED EMBODIMENTS

First, the main features of the present invention will be summarized briefly.

In the present invention, in a radio system for carrying out data transfer after establishing a logical connection between radio terminals prior to data transfer between radio terminals, in the case of transferring data packets containing a single AV stream or one AV stream in which a plurality of single streams are multiplexed while exchanging control packets containing control information regarding transfer of the data packets containing the AV stream, different logical channels are assigned to the data packets containing the AV stream and the control packets containing the control information so that the data packets and the control packets are transferred by these different logical channels.

Alternatively, the data packets and the control information are transferred by different logical channels even in the case of assigning a logical channel to each one of a plurality of AV streams belonging to a single AV application separately.

For example, in the case of transferring the MPEG4 video data and the MPEG4 audio data by the RTP protocol while exchanging the control information by the RTCP protocol, the MPEG4 video/audio data and the control information are transferred by different logical channels, or in the case where the MPEG4 video data and the MPEG4 audio data are multiplexed by the H.223 protocol, for example, the H.223 packets and the control packets are transferred by different logical channels.

According to the present invention, it becomes possible to realize the AV data transfer processing utilizing the transport layer protocol such as RTP protocol, between radio terminals in a radio system for carrying out data transfer after establishing a logical connection between radio terminals prior to data transfer between radio terminals such as Bluetooth.

Also, by assigning different logical channels to the RTP protocol and the RTCP protocol, for example, the AV data transfer control processing can be made easier. In particular, it becomes easier to expand the transfer of AV data that are transferred on the Internet, to the radio system such as Bluetooth (the control processing for the RTP protocol and the RTCP protocol across the Internet and the radio system becomes easier).

In the following, the preferred embodiments of the present invention will be described for the case where the radio LAN system is assumed to be a radio system for carrying out data transfer after establishing a logical connection between radio terminals prior to data transfer between radio terminals. More specifically, the following embodiments are directed to the exemplary case of using the Bluetooth which is a known example of such a radio LAN system.

First Embodiment

Referring now to FIG. 1 to FIG. 12, the first embodiment of the radio terminal and the data transfer method according to the present invention will be described in detail.

Figure 1:
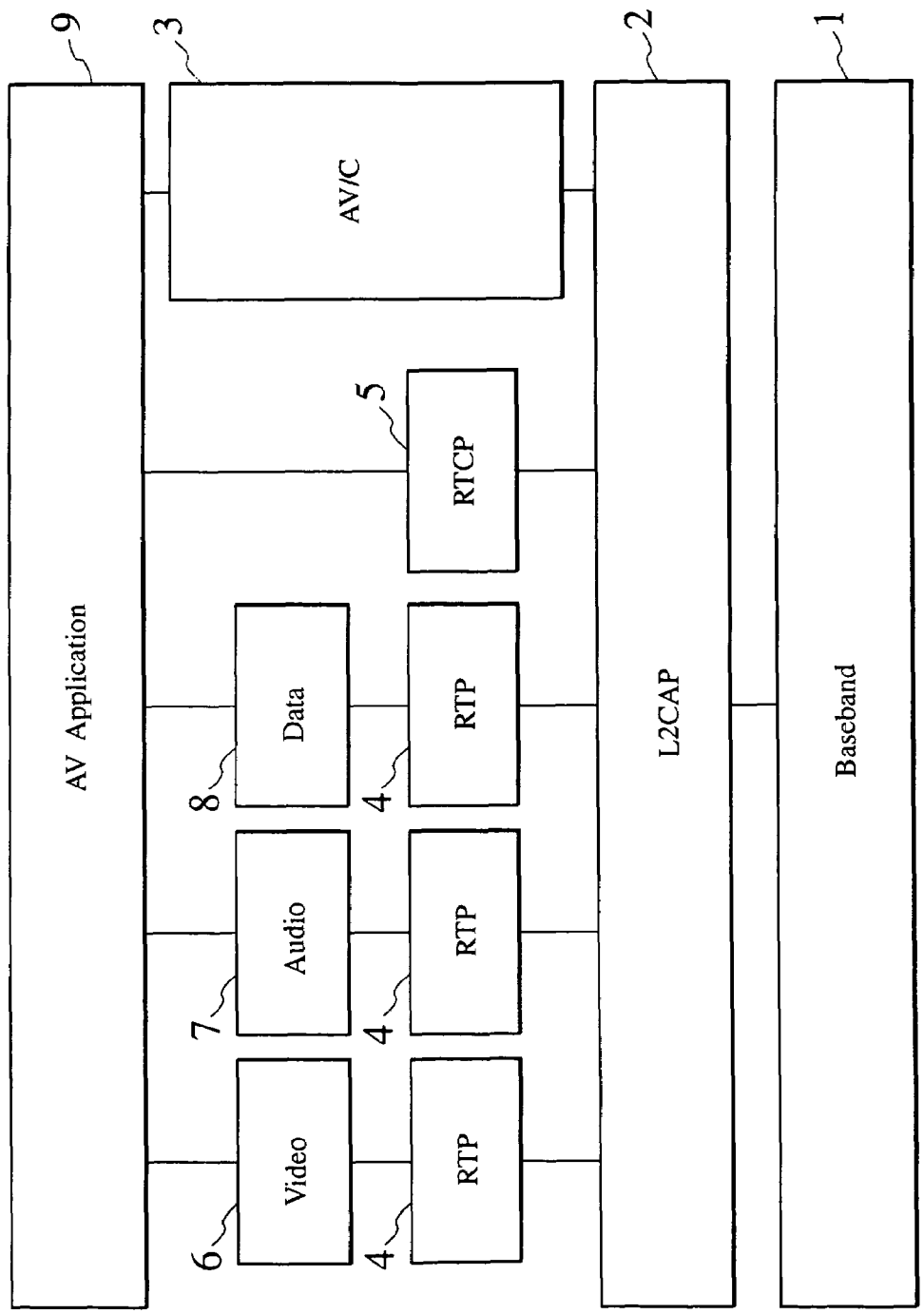
FIG. 1 is a diagram showing a protocol stack to be executed by a radio terminal in the first embodiment of the present invention.

FIG. 1 shows an exemplary protocol stack for the AV data transfer scheme to be executed in this first embodiment.

The protocol stack of FIG. 1 is for the case of using the Bluetooth (in which the physical layer is Baseband and the datalink layer is L2CAP) that is currently in a process of the standardization, as the radio system.

The protocol stack of FIG. 1 is also for the case of executing the AV/C protocol as defined by the IEEE 1394 as the AV control protocol for transferring AV data and thereby providing a function such as the so called session control processing, at a time of executing an AV application at the radio terminal.

The protocol stack of FIG. 1 is also for the case where the actual AV data transfer is carried out such that various data such as video data, audio data and information data are transferred by respective RTP (Realtime Transport Protocol) packets, the RTP packets are further encapsulated into L2CAP packets according to the datalink layer protocol of the Bluetooth, and the AV data transfer control information is exchanged using the RTCP (RTP Control Protocol) protocol.

This embodiment is directed to the case of transferring various data (video, audio, information) as respective different RTP streams as shown in the protocol stack of FIG. 1, where the RTCP protocol is executed as a protocol for exchanging information such as AV data transfer state (error rate, etc.) regarding each RTP stream. The RTP packet and the RTCP packet have basically the same packet format (defined by RFC 1889), and it is possible to distinguish these packets according to information of a packet header field, but in this embodiment, these packets are distinguished by transferring them using different L2CAP channels.

FIG. 1 shows an internal configuration regarding the protocol processing of the radio terminal, which includes processing units for executing respective protocols, i.e., a Baseband processing unit 1 for executing the physical layer processing of the Bluetooth, an L2CAP processing unit 2 for executing the datalink layer processing of the Bluetooth, an AV/C protocol processing unit 3 for executing the AV/C protocol at an upper layer of the L2CAP processing unit 2, RTP processing units 4 for executing the RTP protocol, various processing units including a Video processing unit 6, an Audio processing unit 7, and Data processing unit 8 which are provided at an upper layer of the RTP processing unit 4 and corresponding to a group of AV data transfer protocols, an RTCP processing unit 5 for executing the RTCP protocol, and an AV application processing unit 9 for executing an AV application at an upper layer of the above described processing units.

Note that the AV/C protocol recognizes nodes in terms of Units, and constituent elements (such as Display or VTR, for example) within each node in terms of SubUnits. Also, in the protocol for transferring the AV/C control commands (commands such as "play", "stop", "fast forward", etc.), a transmission of a command and a reception of a response are to be carried out as one set.

Figure 2:
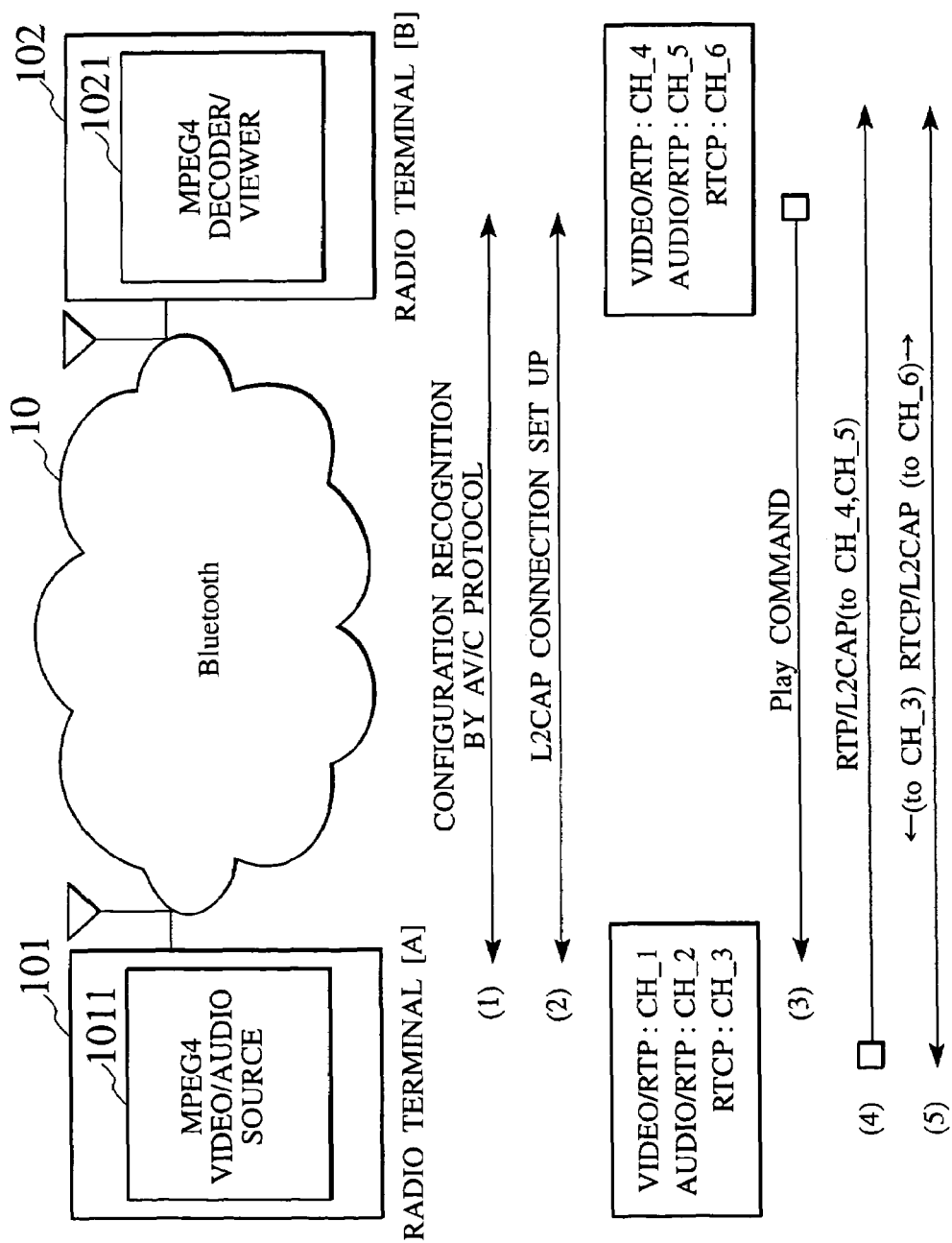
FIG. 2 is a schematic diagram showing an exemplary configuration of a radio network using a radio terminal according to the first embodiment of the present invention.

FIG. 2 shows an exemplary configuration of a radio network in the case of carrying out the AV data transfer by the protocol stack as described above.

In FIG. 2, a radio terminal 101 and a radio terminal 102 are connected to a Bluetooth network 10, and an MPEG4 video/audio source (SubUnit) 1011 which is a function for providing MPEG4 video/audio sources such as VTR for example is provided in the radio terminal 101, while an MPEG4 decoder/viewer function (SubUnit) 1021 which is a function for decoding the MPEG4 video/audio data and presenting (displaying/audio outputting) the decoded video/audio data to a user is provided in the radio terminal 102.

Note that, in practice, the MPEG4 video/audio source 1011 of the radio terminal 101 may be the MPEG4 video/audio data received from another device that are related by the radio terminal 101. Similarly, in practice, the MPEG4 decoder/viewer function 1021 of the radio terminal 102 may be the MPEG4 decoder viewer function in another device to which the received MPEG4 video/audio data are relayed by the radio terminal 102.

In FIG. 2, it is assumed that the radio terminal 101 has a node ID=[A] and the radio terminal 102 has a node ID=[B].

Next, the processing in the case of carrying out the AV data transfer using the protocol stack of FIG. 1 in the above described configuration will be described with reference to the exemplary sequence shown in FIG. 2.

(1) Each one of the radio terminal 101 and the radio terminal 102 acquires information on constituent elements in the other one. As a result, the radio terminal 102 recognizes that the MPEG4 video/audio source 1011 exists as a constituent element in the radio terminal 101, and the radio terminal 101 recognizes that the MPEG4 decoder/viewer function 1021 exists as a constituent element in the radio terminal 102.

(2) Respective L2CAP logical channels for the AV data transfer (two channels including a video data channel and an audio data channel in this example) and an L2CAP logical channel for the AV data transfer control (one channel for the video data channel and the audio data channel in this example) are set up between the radio terminal 101 and the radio terminal 102, as in the following example.

The radio terminal 101 acquires CH=1 for the video data transfer, CH=2 for the audio data transfer, and CH=3 for the AV data transfer control.
The radio terminal 102 acquires CH=4 for the video data transfer, CH=5 for the audio data transfer, and CH=6 for the AV data transfer control.

(3) The radio terminal 102 transmits a playback start (Play) command to the MPEG4 video/audio source 1011 in the radio terminal 101.

(4) The radio terminal 101 transfers the video data and the audio data to the radio terminal 102 by using respective different logical channels (CH=4 and CH=5 in this example).

(5) The AV data transfer control information is exchanged between the radio terminal 101 and the radio terminal 102 by using one logical channel for the video data and the audio data (CH=3 and CH=6 in this example).

In the above described sequence, each one of the radio terminal 101 and the radio terminal 102 maintains a correspondence between the AV data transferred and the L2CAP logical channels as follows.

FIG. 3 shows an exemplary correspondence table for the AV data and the L2CAP logical channels maintained by the radio terminal 101. In the correspondence table of FIG. 3, the AV data to be transferred to the radio terminal of the node ID=[B] (that is the radio terminal 102) include MPEG4 video data, MPEG4 audio data, and their control information (Control). It is also indicated that each AV data is transferred by the RTP/RTCP protocol. In addition, an L2CAP logical channel corresponding to each RTP/RTCP stream is indicated. More specifically, in the case of FIG. 3, among the own terminal side logical channels, the logical channel CH=1 corresponds to the MPEG4-Video (RTP stream), the logical channel CH=2 corresponds to the MPEG4-Audio (RTP stream), and the logical channel CH=3 corresponds to the data transfer control information (RTCP), while among the destination side logical channels, the logical channel CH=4 corresponds to the MPEG4-Video (RTP stream), the logical channel CH=5 corresponds to the MPEG4-Audio (RTP stream), and the logical channel CH=6 corresponds to the data transfer control information (RTCP).

FIG. 4 shows an exemplary correspondence table for the AV data the L2CAP logical channels maintained by the radio terminal 102. The correspondence table of FIG. 4 is configured similarly as that of FIG. 3 such that information on the AV data received by the radio terminal 102 and the L2CAP logical channels assigned to the AV data transfer control data can be obtained from this correspondence table.

In the following, a more specific L2CAP logical channel set up (assignment) scheme in the case of carrying out the AV data transfer between the radio terminal 101 and the radio terminal 102 by utilizing the protocols, the radio network configuration and the correspondence tables as described above will be described.

Figure 5:
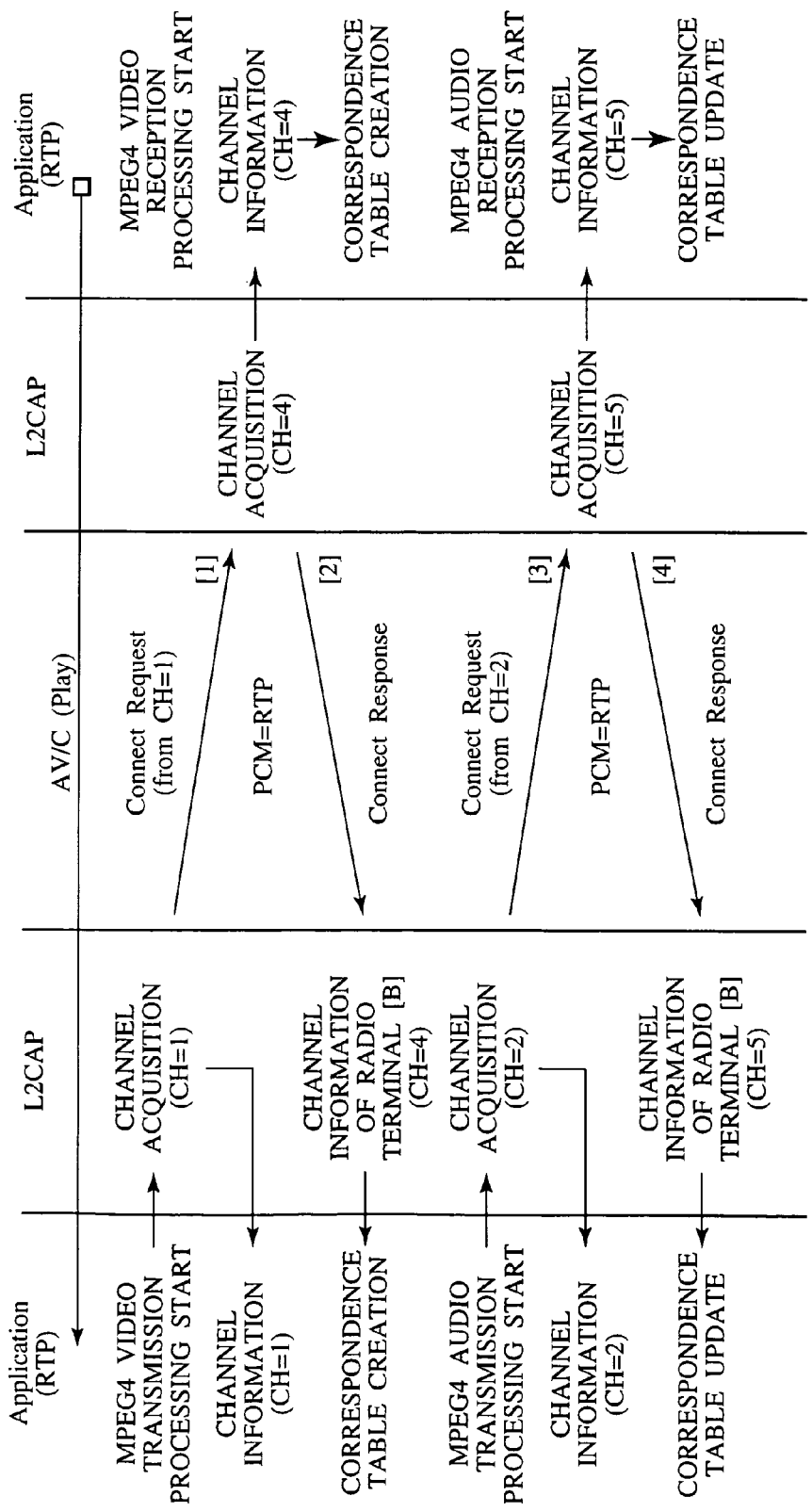
FIG. 5 is a sequence chart showing a first part of one exemplary processing sequence for a logical channel set up at a time of AV data transfer between radio terminals according to the first embodiment of the present invention.
Figure 6:
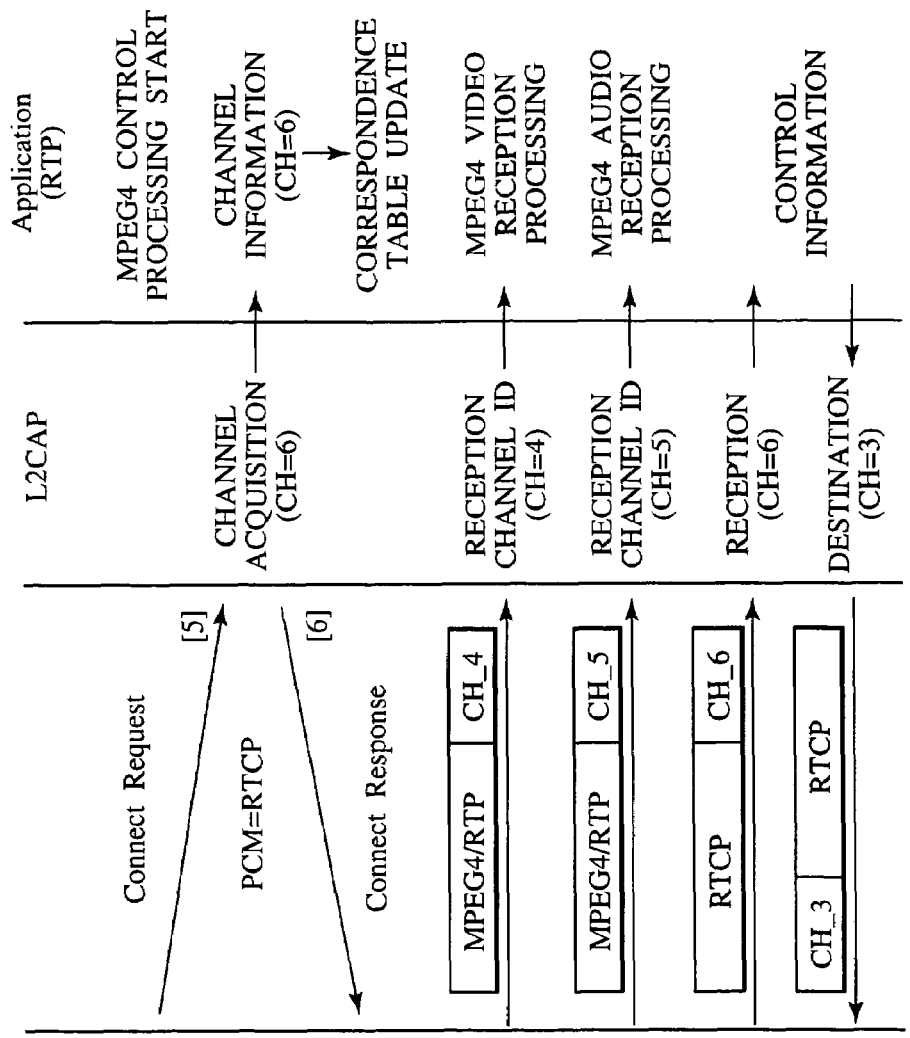
FIG. 6 is a sequence chart showing a second part of one exemplary processing sequence for a logical channel set up at a time of AV data transfer between radio terminals according to the first embodiment of the present invention.

FIG. 5 and FIG. 6 show an exemplary processing sequence in this case. Note that FIG. 5 and FIG. 6 are showing one series of processing in which the processing of FIG. 5 is to be followed by the processing of FIG. 6. Note however that various procedures can be carried out simultaneously or interchanged according to the need as will be described below. Note also that FIG. 5 shows the processing starting from the MPEG4 video data transmission processing (so that the processings corresponding to the procedures (1) and (2) of FIG. 2 are omitted here).

More specifically, this processing sequence proceeds as follows.

The radio terminal 102 transmits the Play command to the radio terminal 101 by using the AV/C protocol, so as to request transfer of the MPEG4 video/audio data.

The radio terminal 101 starts the transmission processing for the MPEG4 video data, the MPEG4 audio data, and the control information.

The radio terminal 101 carries out the processing for acquiring the L2CAP logical channel for the MPEG4 video transfer.

(1) The radio channel 101 sets up the own terminal channel number (which is assumed to be CH=1), and notifies the channel number (CH=1) that is set up to the AV application.

(2) The radio terminal 101 transmits a connection request (Connect_Request) packet (packet [1] in FIG. 5) in order to acquire the channel number of the radio terminal 102.

(3) Upon receiving the connection request (Connect_Request) packet, the radio terminal 102 sets up the own terminal channel number (which is assumed to be CH=4), and notifies the channel number (CH=1) of the radio terminal 101 as described in the received Connect_Request packet and the own terminal channel number (CH=4) that is set up to the AV application.

(4) The radio terminal 102 creates the correspondence table of channels for the transfer processing of the MPEG4 video data, the MPEG4 audio data, and the control information.

(5) The radio terminal 102 transmits a connection response (Connect_Response) packet (packet [2] in FIG. 5) in order to notify the channel number that is set up to the radio terminal 101.

(6) Upon receiving the connection response (Connect_Response) packet, the radio terminal 101 notifies the channel number (CH=4) of the radio terminal 102 as described in the Connect_Response packet to the AV application.

(7) The radio terminal 101 creates the correspondence table of channels for the transfer processing of the MPEG4 video data, the MPEG4 audio data, and the control information.

The radio terminal 101 carries out the processing for acquiring the L2CAP logical channel for the MPEG4 audio transfer.

The processings similar to the procedures (1) to (7) described above are carried out to set up the channel number (which is assumed to be CH=2) on the radio terminal 101 side and the channel number (which is assumed to be CH=5) on the radio terminal 102 side.

In these processings, the radio terminal 101 transmits the Connect_Request packet (packet [3] in FIG. 5) and the radio terminal 102 transmits the Connect_Response packet (packet [4] in FIG. 5).

Also, each one of the radio terminals 101 and 102 updates the correspondence table of channels for the transfer processing of the MPEG4 video data, the MPEG4 audio data, and the control information.

The radio terminal 101 carries out the processing for acquiring the L2CAP logical channel for the MPEG4 video/audio transfer control.

The processings similar to the procedures (1) to (7) described above are carried out to set up the channel number (which is assumed to be CH=3) on the radio terminal 101 side and the channel number (which is assumed to be CH=6) on the radio terminal 102 side.

In these processings, the radio terminal 101 transmits the Connect_Request packet (packet [5] in FIG. 6) and the radio terminal 102 transmits the Connect_Response packet (packet [6] in FIG. 6).

Also, each one of the radio terminals 101 and 102 updates the correspondence table of channels for the transfer processing of the MPEG4 video data, the MPEG4 audio data, and the control information.

This completes the logical channel set up and the channel correspondence table set up.

Hereafter, the necessary data communication can be carried out according to the need (the destination logical channels corresponding to the data to be transmitted (the MPEG4 video data, the MPEG4 audio data, and the control information in this example) can be obtained by referring to the channel correspondence table), as follows.

The radio terminal 101 transmits the MPEG4 video data by writing the destination logical channel (CH=4) therein, toward the radio terminal 102.

The radio terminal 101 transmits the MPEG4 audio data by writing the destination logical channel (CH=5) therein, toward the radio terminal 102.

The radio terminal 101 transmits the control information for the MPEG4 video/audio data transfer control by writing the destination logical channel (CH=6) therein, toward the radio terminal 102.

The radio terminal 102 transmits the control information for the MPEG4 video/audio data transfer control by writing the destination logical channel (CH=3) therein, toward the radio terminal 101.

By carrying out such a series of processing, it becomes possible to realize the transfer of the MPEG4 video/audio data from the radio terminal 101 to the radio terminal 102 (and the exchange of the control information for that purpose).

Note that the exemplary processing sequence described above sequentially carries out the set up of the three L2CAP logical channels, but there is no need to carry out these processings for acquiring the L2CAP logical channels in this order. For example, the processings for acquiring these three logical channels may be carried out in parallel or the order for carrying out these processings may be interchanged.

Here, there are various methods available for the assignment of the L2CAP logical channel number to be assigned to the Video stream, the L2CAP logical channel number to be assigned to the Audio stream, and the L2CAP logical channel number for the transfer of the control information for the transfer control.

For example, it is possible to use a method for assigning them randomly from the available logical channel numbers.

Also, it is possible to use a method for assigning the available consecutive logical channel numbers among the available L2CAP channel numbers at each radio terminal. In this method, the logical channel numbers are assigned such that, if the L2CAP logical channel numbers up to No. 8 are already utilized at the radio terminal 101 of FIG. 2, at a time of transfer of a new AV stream data, the logical channel No. 9 is assigned to the Video stream, the logical channel No. 10 is assigned to the Audio stream, and the logical channel No. 11 is assigned to the control information transfer, for example.

As such, there are various methods available for the assignment of the L2CAP logical channel numbers, and the series of processing for the logical channel set up processing as shown in FIG. 5 and FIG. 6 can be simplified by determining the specific assignment method to be used in advance.

In the example of FIG. 5 and FIG. 6, the logical channel for the exchange of the control information is set up with respect to one AV application (one session), rather than assigning the L2CAP logical channel for the exchange of the control information for each AV stream (the Video stream and the Audio stream in the above example). More specifically, the RTCP protocol is executed with respect to one AV application (session). However, the method for executing the RTCP protocol is not necessarily limited to this particular case.

For example, it is possible to carry out the exchange of the control information by separately acquiring the logical channel for the RTCP for each AV stream (the logical channel No. 1 and No. 2 on the radio terminal 101 set up in the example of FIG. 5 and FIG. 6). For instance, in the example of FIG. 5 and FIG. 6, two channels may be used as the L2CAP logical channel for the video data transfer control and the L2CAP logical channel for the audio data transfer control.

It is also possible to use an intermediate form of the two methods described above, that is, a method for carrying out the exchange of the control information by acquiring m sets of logical channels for the RTCP with respect to n (1<m<n) sets of AV streams belonging to one AV application (in which case the n sets of AV streams will be suitably distributed among the m sets of logical channels for the RTCP).

Such a method for setting up the logical channels for the control information exchange can be notified by a preliminary set up procedure (session establishing procedure) or the like before the execution of each AV application. For example, it is possible to use a method in which the control information is exchanged by describing the control information in the Descriptor (attribute information description) of the AV/C in advance and reading it beforehand, by applying the AV/C protocol to this session establishing procedure.

Figure 7:
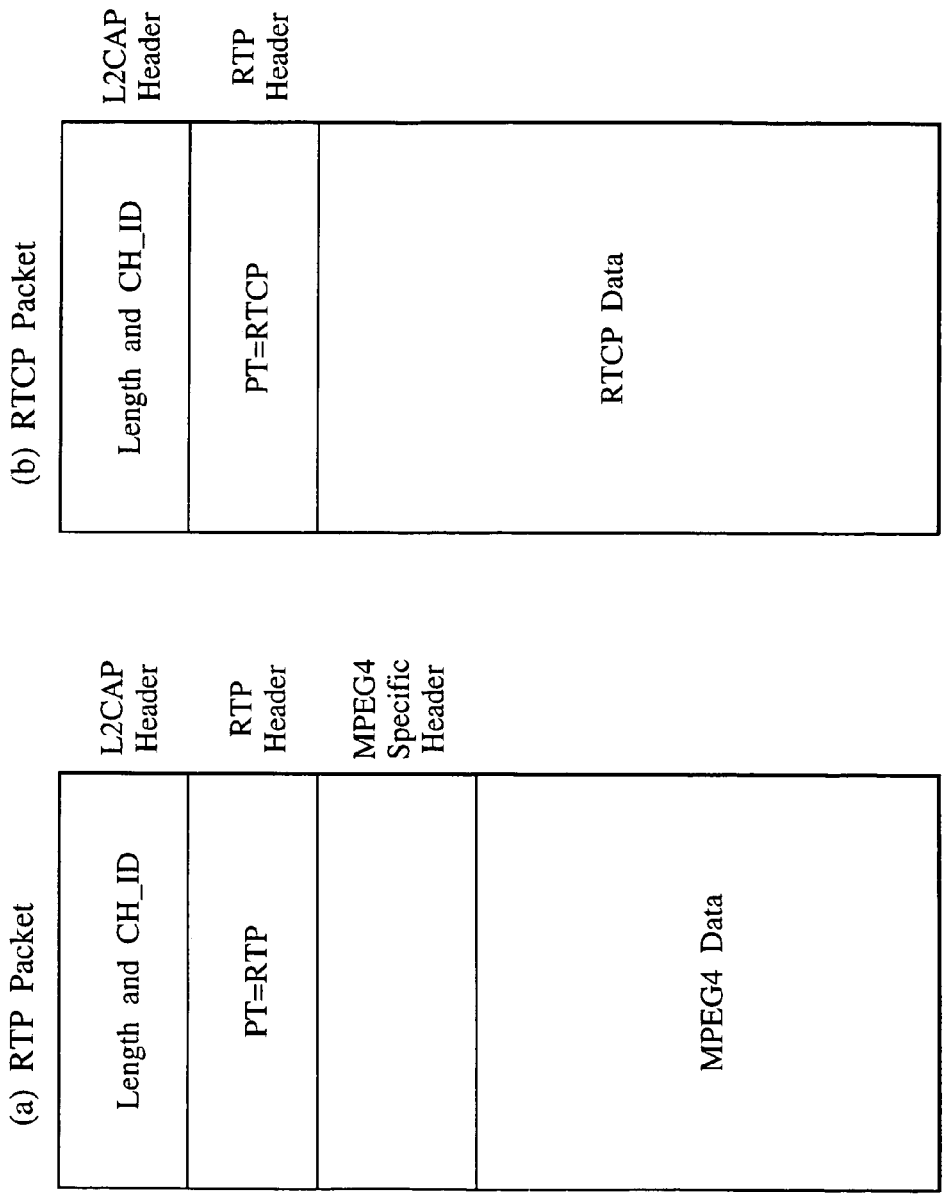
FIG. 7 is a diagram showing exemplary packet formats of an RTP packet and an RTCP packet to be transferred between radio terminals according to the first embodiment of the present invention.

A part (a) of FIG. 7 shows an exemplary packet format for the L2CAP packet for transferring the RTP packets to be transferred by the logical channel (CH=4, 5) and a part (b) of FIG. 7 shows an exemplary packet format for the L2CAP packet for transferring the RTCP packets to be transferred by the logical channel (CH=3, 6), in the procedure of FIG. 5 and FIG. 6.

In the exemplary packet format of FIG. 7, an RTP header is provided next to an L2CAP header (that contains the packet length and the channel ID) of each packet, and whether this packet is the RTP packet of the RTCP packet can be identified by a PT (Payload Type) field in this RTP header. Also, the RTP packet header is accompanied by an MPEG4_Specific_Header for the purpose of providing functions for identifying whether the loaded data are the MPEG4 video data or the MPEG4 audio data, and identifying the encoding scheme of the loaded data. Note however that this MPEG4_Specific_Header is not an absolutely necessary field in the case where such information can be notified in advance by the earlier exchange of the session control information.

Figure 8:
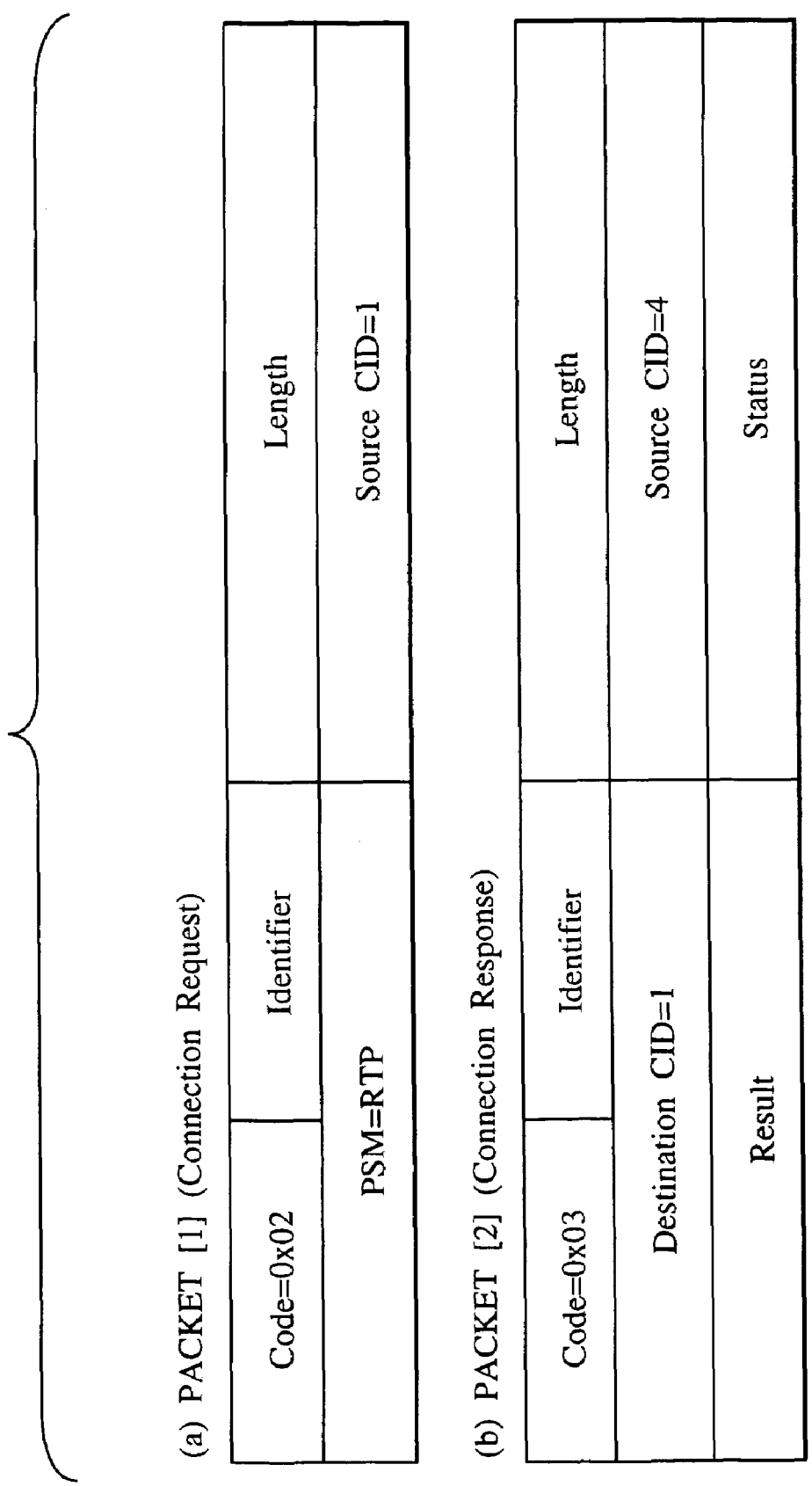
FIG. 8 is a diagram showing exemplary header formats of first two packets to be transferred between radio terminals in the processing sequence of FIG. 5 and FIG. 6.

FIGS. 8, 9 and 10 show examples of the header region in the Connect_Request packet (packets [1], [3], [5]) and the Connect_Response packet (packets [2], [4], [6]) that are transferred in the series of processing shown in FIG. 5 and FIG. 6. A part (a) of FIG. 8 corresponds to the packet [1], a part (b) of FIG. 8 corresponds to the packet [2], a part (a) of FIG. 9 corresponds to the packet [3], a part (b) of FIG. 9 corresponds to the packet [4], a part (a) of FIG. 10 corresponds to the packet [5], and a part (b) of FIG. 10 corresponds to the packet [6].

As shown in a part (a) of FIG. 8, the header region of the packet [1] contains information on a Code value (=0x02) for indicating that this packet is the Connect_Request packet, an identifier for identifying the Connect_Request at each node, a packet length (Length), a protocol identifier (PSM (Protocol Service Multiplexor)) for indicating that a protocol corresponding to the packet being transferred is RTP, and a source channel ID (Source CID) for indicating that the logical channel on the radio terminal (101) which is sending this request packet is CH=1, etc.

As shown in a part (b) of FIG. 8, the header region of the packet [2] contains information on a Code value (=0x03) for indicating that this packet is the Connect_Response packet, an identifier for identifying the Connect_Response at each node, a packet length (Length), a destination channel ID (Destination CID) for indicating that a channel on the radio terminal (101) corresponding to this response packet is CH=1, a source channel ID (Source CID) for indicating that the logical channel on the radio terminal (102) which is sending this response packet is CH=4, etc.

As shown in parts (a) and (b) of FIG. 9, the information contained in the header region of the packet [3] is similar to that of the packet [1], and the information contained in the header region of the packet [4] is similar to that of the packet [2].

As shown in parts (a) and (b) of FIG. 10, the information contained in the header region of the packet [5] differs from that of the packets [1] and [3] in that the protocol corresponding to the packet being transferred is indicated as RTCP (PSM=RTCP), and the information contained in the header region of the packet [6] differs from that of the packets [2] and [4] in that the protocol corresponding to the packet being transferred is indicated as RTCP (PSM=RTCP).

In the following, the scheme for carrying out the AV data transfer between the radio terminal 101 and the radio terminal 102 by a method different from the series of processing shown in FIG. 5 and FIG. 6 will be described.

Figure 11:
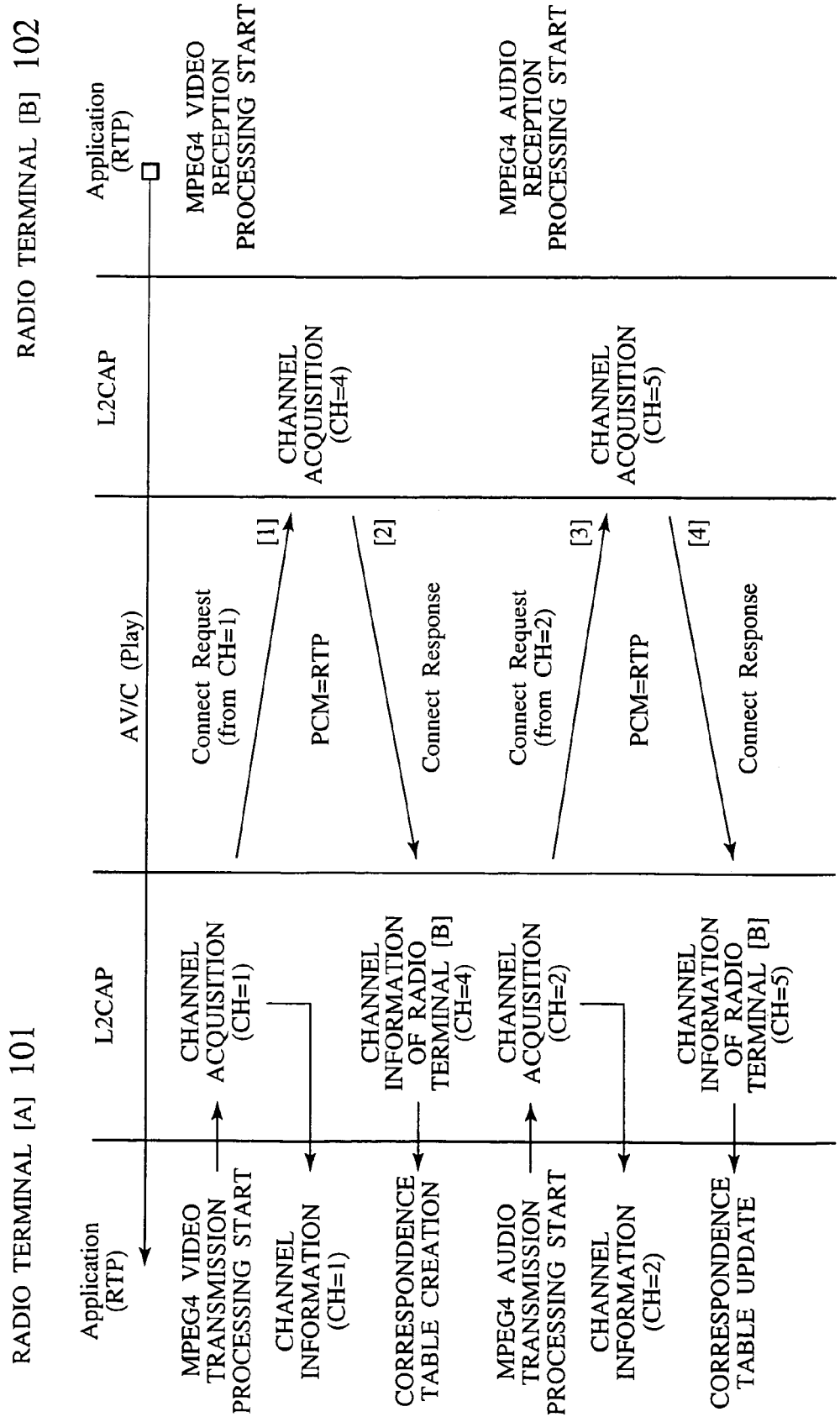
FIG. 11 is a sequence chart showing a first part of another exemplary processing sequence for a logical channel set up at a time of AV data transfer between radio terminals according to the first embodiment of the present invention.
Figure 12:
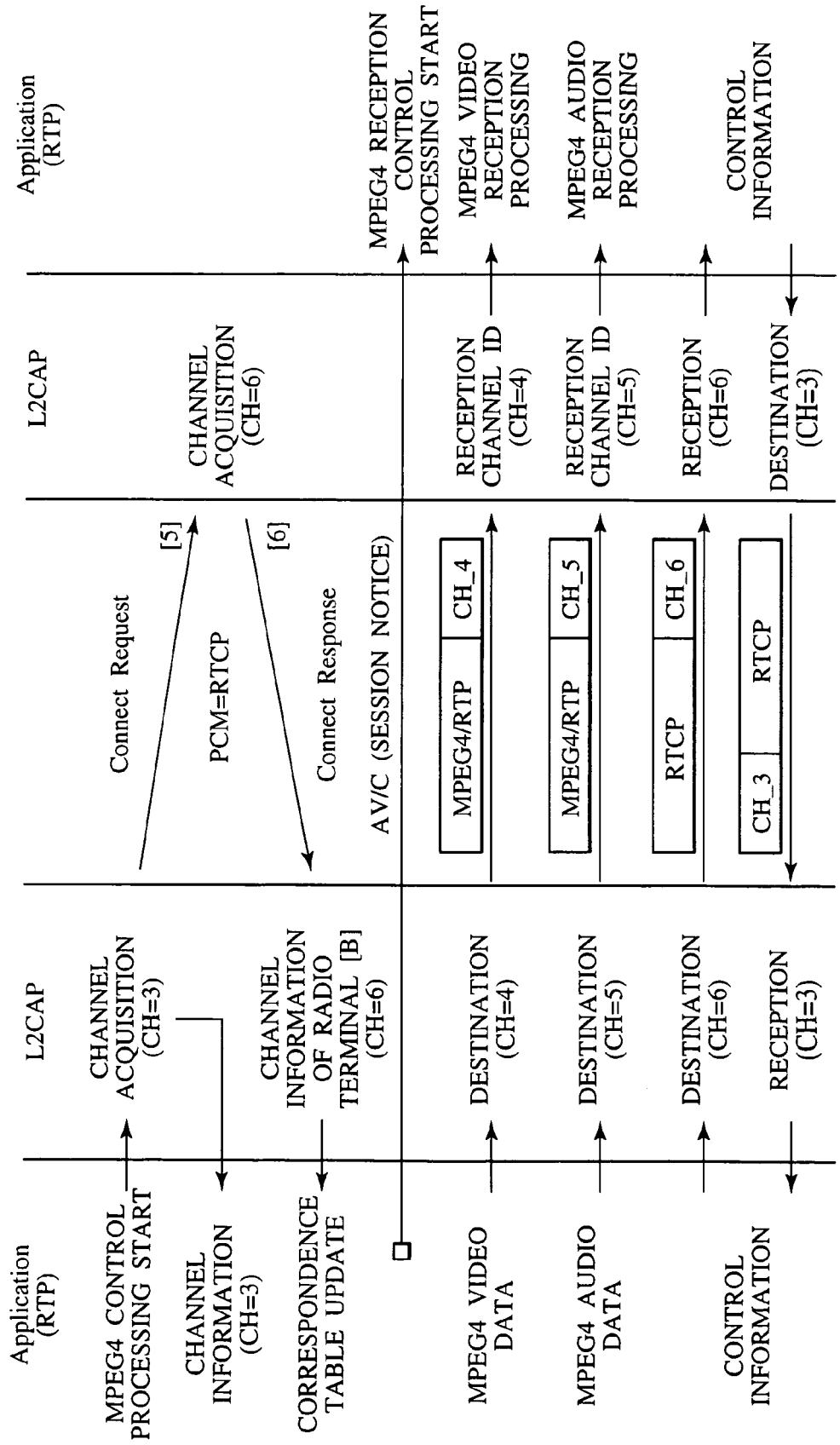
FIG. 12 is a sequence chart showing a second part of another exemplary processing sequence for a logical channel set up at a time of AV data transfer between radio terminals according to the first embodiment of the present invention.

FIG. 11 and FIG. 12 show an exemplary processing sequence in this case. Note that FIG. 11 and FIG. 12 are showing one series of processing in which the processing of FIG. 11 is to be followed by the processing of FIG. 12. Note however that various procedures can be carried out simultaneously or interchanged according to the need as will be described below. Note also that FIG. 11 shows the processing starting from the MPEG4 video data transmission processing (so that the processings corresponding to the procedures (1) and (2) of FIG. 2 are omitted here).

The procedure of FIG. 11 and FIG. 12 differs from the procedure of FIG. 5 and FIG. 6 in the method for creating the correspondence table of the logical channel numbers in the radio terminal 102 which is the receiving side terminal. In this scheme, the radio terminal 102 does not create the correspondence table of the logical channels at a time of setting up the individual L2CAP logical channel, and the correspondence table is notified by using the AV/C command after the logical channel set up is finished.

More specifically, this processing sequence proceeds as follows.

The radio terminal 102 transmits the Play command to the radio terminal 101 by using the AV/C protocol, so as to request transfer of the MPEG4 video/audio data.

The radio terminal 101 starts the transmission processing for the MPEG4 video data, the MPEG4 audio data, and the control information.

The radio terminal 101 carries out the processing for acquiring the L2CAP logical channel for the MPEG4 video transfer.

The processings similar to the procedures (1) to (7) described above with references to FIG. 5 and FIG. 6 are carried out to set up the channel number (which is assumed to be CH=1) on the radio terminal 101 side and the channel number (which is assumed to be CH=4) on the radio terminal 102 side.

In these processings, the radio terminal 101 transmits the Connect_Request packet (packet [1] in FIG. 11) and the radio terminal 102 transmits the Connect_Response packet (packet [2] in FIG. 12).

Here only the radio terminal 101 creates the correspondence table of channels for the transfer processing of the MPEG4 video data, the MPEG4 audio data, and the control information.

The radio terminal 101 carries out the processing for acquiring the L2CAP logical channel for the MPEG4 audio transfer.

The processings similar to the procedures (1) to (7) described above with references to FIG. 5 and FIG. 6 are carried out to set up the channel number (which is assumed to be CH=2) on the radio terminal 101 side and the channel number (which is assumed to be CH=5) on the radio terminal 102 side.

In these processings, the radio terminal 101 transmits the Connect_Request packet (packet [3] in FIG. 11) and the radio terminal 102 transmits the Connect_Response packet (packet [4] in FIG. 11).

Here only the radio terminal 101 updates the correspondence table of channels for the transfer processing of the MPEG4 video data, the MPEG4 audio data, and the control information.

The radio terminal 101 carries out the processing for acquiring the L2CAP logical channel for the MPEG4 video/audio transfer control.

The processings similar to the procedures (1) to (7) described above with references to FIG. 5 and FIG. 6 are carried out to set up the channel number (which is assumed to be CH=3) on the radio terminal 101 side and the channel number (which is assumed to be CH=6) on the radio terminal 102 side.

In these processings, the radio terminal 101 transmits the Connect_Request packet (packet [5] in FIG. 12) and the radio terminal 102 transmits the Connect_Response packet (packet [6] in FIG. 12).

Here only the radio terminal 101 updates the correspondence table of channels for the transfer processing of the MPEG4 video data, the MPEG4 audio data, and the control information.

The radio terminal 101 notifies the correspondence table of the logical channels created in the above described series of processing to the radio terminal 102 by using the AV/C command (the session notice).

This completes the logical channel set up and the channel correspondence table set up.

Hereafter, the necessary data communication can be carried out according to the need (the destination logical channels corresponding to the data to be transmitted (the MPEG4 video data, the MPEG4 audio data, and the control information in this example) can be obtained by referring to the channel correspondence table), as follows.

The radio terminal 101 transmits the MPEG4 video data by writing the destination logical channel (CH=4) therein, toward the radio terminal 102.

The radio terminal 101 transmits the MPEG4 audio data by writing the destination logical channel (CH=5) therein, toward the radio terminal 102.

The radio terminal 101 transmits the control information for the MPEG4 video/audio data transfer control by writing the destination logical channel (CH=6) therein, toward the radio terminal 102.

The radio terminal 102 transmits the control information for the MPEG4 video/audio data transfer control by writing the destination logical channel (CH=3) therein, toward the radio terminal 101.

By carrying out such a series of processing, it also becomes possible to realize the transfer of the MPEG4 video/audio data from the radio terminal 101 to the radio terminal 102 (and the exchange of the control information for that purpose).

Note that the information to be notified from the radio terminal 101 to the radio terminal 102 in the session notification processing in the above described series of processing can be the correspondence of the L2CAP logical channels that is stored at the radio terminal 101 as shown in FIG. 3 (in this case, the radio terminal 102 creates the correspondence table as shown in FIG. 4 from the correspondence shown in FIG. 3 that is notified from the radio terminal 101).

Note also that it is possible to carry out the processing for notifying the encoding scheme of the audio/video data that is executable at the radio terminal 101, the processing for notifying the parameters of QOS required between the radio terminals, the processing for notifying necessary ones of the control parameters transferred by the RTCP protocol, etc., in this session notification processing. In order to realize such a processing, commands or parameters that can notify such information can be defined on the AV/C protocol.

Note also that, in the exemplary processing sequence described above, the processings for acquiring the L2CAP logical channels may be carried out in parallel, or the order for carrying out these processings may be interchanged, similarly as in the case of FIG. 5 and FIG. 6.

Second Embodiment

Referring now to FIG. 13 to FIG. 18, the second embodiment of the radio terminal and the data transfer method according to the present invention will be described in detail.

Figure 13:
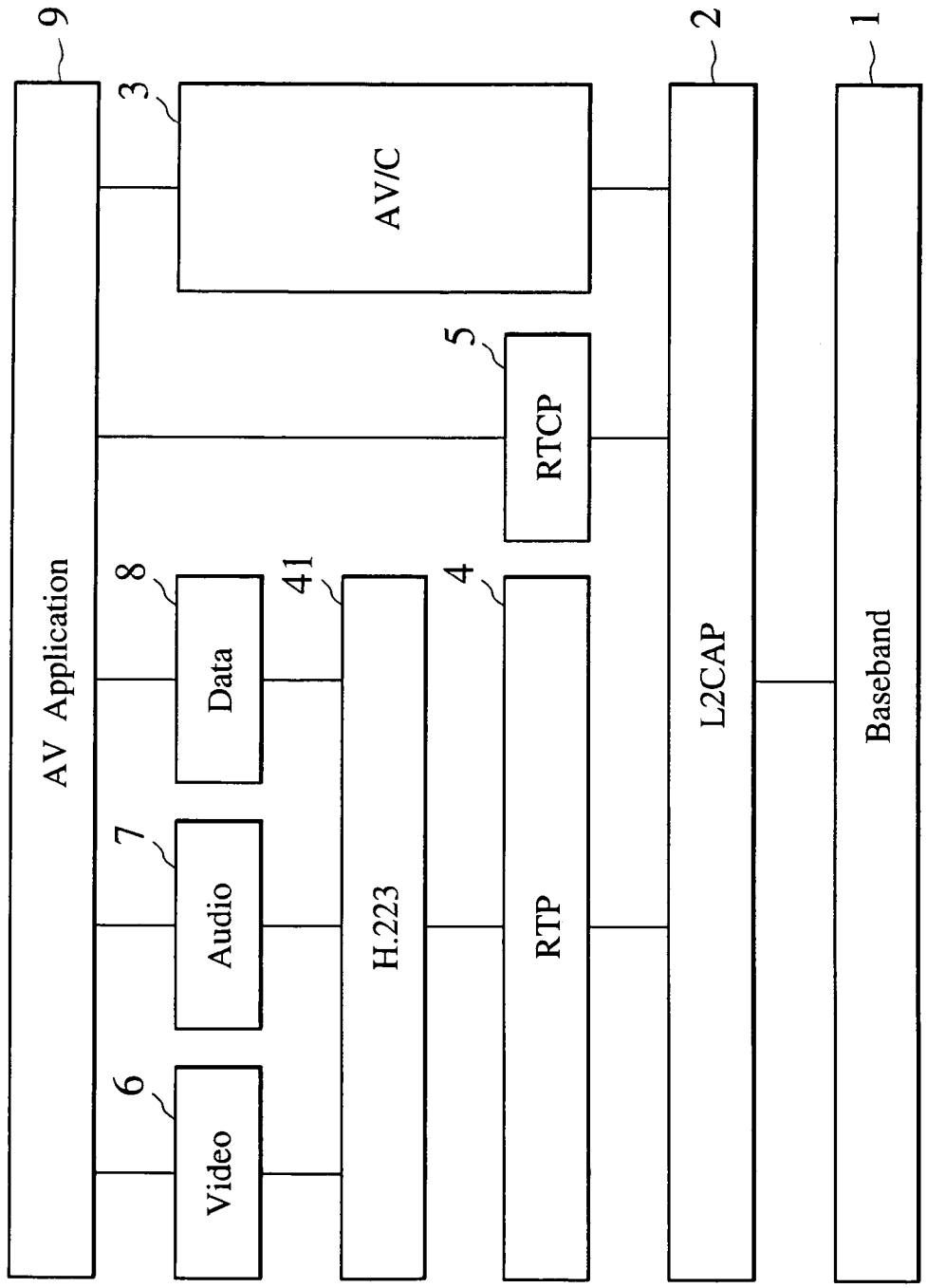
FIG. 13 is a diagram showing a protocol stack to be executed by a radio terminal in the second embodiment of the present invention.

FIG. 13 shows an exemplary protocol stack for the AV data transfer scheme to be executed in this embodiment.

Similarly as in the case shown in FIG. 1, the protocol stack of FIG. 13 is for the case of using the Bluetooth (in which the physical layer is Baseband and the datalink layer is L2CAP) that is currently in a process of the standardization, as the radio system.

The protocol stack of FIG. 13 is also for the case of executing the AV/C protocol as defined by the IEEE 1394 as the AV control protocol for transferring AV data and thereby providing a function such as the so called session control processing, at a time of executing an AV application at the radio terminal.

However, regarding the actual AV data transfer, the protocol stack of FIG. 13 is for the case where the video/audio data are to be transferred after multiplexing by the H.223 protocol (at an H.223 processing unit 41) and then encapsulating into the RTP packets. This RTP stream is further encapsulated into L2CAP packets according to the datalink layer protocol of the Bluetooth.

This embodiment is directed to the case of transferring various data (video, audio, information) by the RTP protocol after multiplexing the various data into one H.223 stream, where the RTCP protocol is executed as a protocol for exchanging information such as AV data transfer state (error rate, etc.) regarding each RTP stream. Similarly as in the case of the first embodiment, the RTP packet and the RTCP packet are transferred by using different L2CAP channels.

Figure 14:
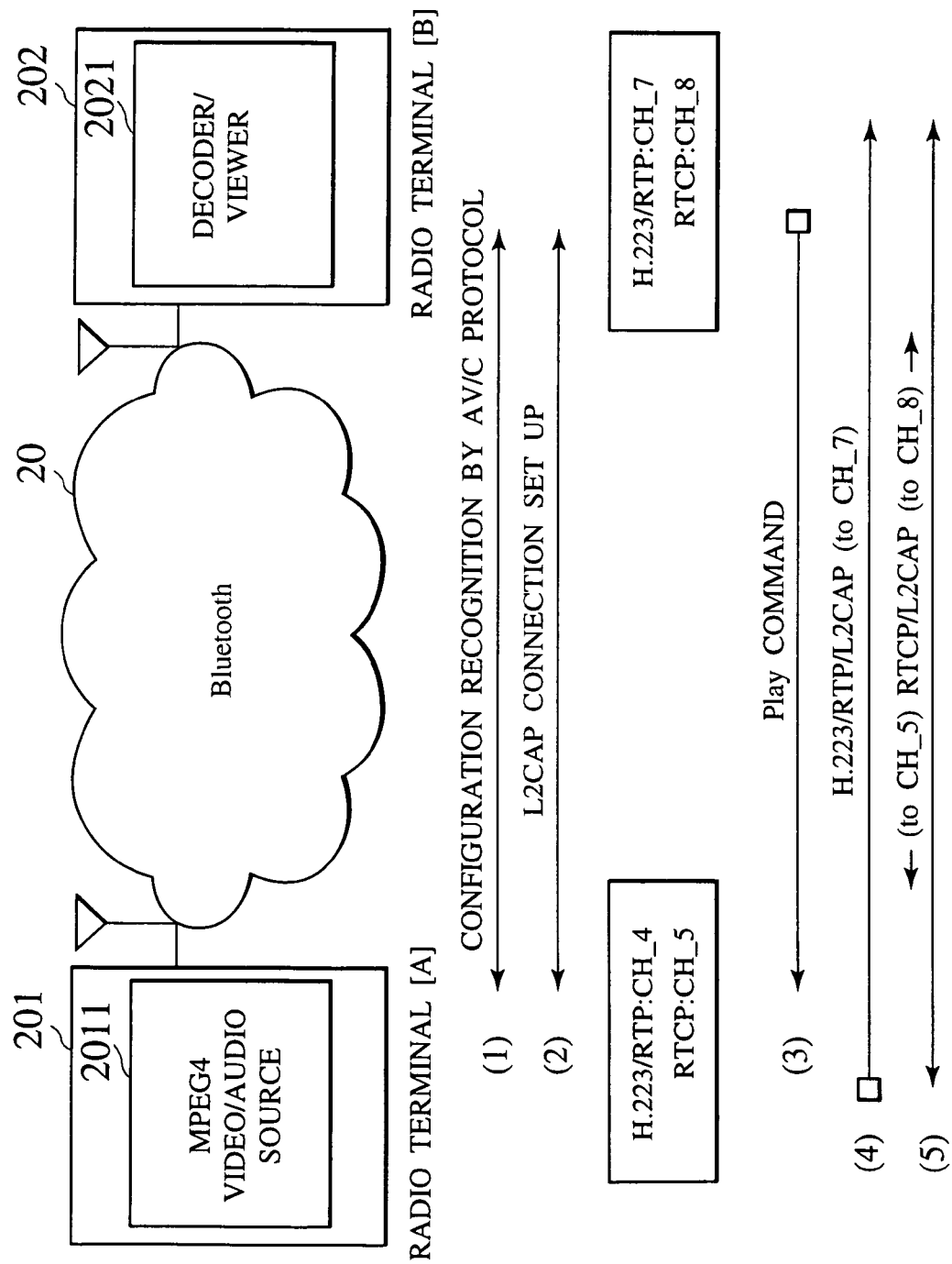
FIG. 14 is a schematic diagram showing an exemplary configuration of a radio network using a radio terminal according to the second embodiment of the present invention.

FIG. 14 shows an exemplary configuration of a radio network in the case of carrying out the AV data transfer by the protocol stack as described above.

In FIG. 14, a radio terminal 201 and a radio terminal 202 are connected to a Bluetooth network 20, and an MPEG4 video/audio source (SubUnit) 2011 which is a function for providing MPEG4 video/audio sources such as VTR for example is provided in the radio terminal 201, while an MPEG4 decoder/viewer function (SubUnit) 2021 which is a function for decoding the MPEG4 video/audio data and presenting (displaying/audio outputting) the decoded video/audio data to a user is provided in the radio terminal 202.

Note that, similarly as in the first embodiment, in practice, the MPEG4 video/audio source 2011 of the radio terminal 201 may be the MPEG4 video/audio data received from another device that are related by the radio terminal 201. Similarly, in practice, the MPEG4 decoder/viewer function 2021 of the radio terminal 202 may be the MPEG4 decoder viewer function in another device to which the received MPEG4 video/audio data are relayed by the radio terminal 202.

In FIG. 2, it is assumed that the radio terminal 201 has a node ID=[A] and the radio terminal 202 has a node ID=[B].

Next, the processing in the case of carrying out the AV data transfer using the protocol stack of FIG. 13 in the above described configuration will be described with reference to the exemplary sequence shown in FIG. 14.

(1) Each one of the radio terminal 201 and the radio terminal 202 acquires information on constituent elements in the other one. As a result, the radio terminal 202 recognizes that the MPEG4 video/audio source 2011 exists as a constituent element in the radio terminal 201, and the radio terminal 201 recognizes that the MPEG4 decoder/viewer function 2021 exists as a constituent element in the radio terminal 202.

(2) An L2CAP logical channel for the AV data transfer and an L2CAP logical channel for the AV data transfer control are set up between the radio terminal 201 and the radio terminal 202, as in the following example.

The radio terminal 201 acquires CH=4 for the AV data (H.223/RTP) transfer, and CH=5 for the AV data transfer control.

The radio terminal 202 acquires CH=7 for the AV data (H.223/RTP) transfer, and CH=8 for the AV data transfer control.

(3) The radio terminal 202 transmits a playback start (Play) command to the MPEG4 video/audio source 2011 in the radio terminal 201.

(4) The radio terminal 201 transfers the AV data (H.223/RTP) to the radio terminal 202 by using one logical channel (CH=7 in this example).

(5) The AV data transfer control information is exchanged between the radio terminal 201 and the radio terminal 202 by using one logical channel (CH=5 and CH=8 in this example) for the AV data multiplexed into one H.223 stream.

In the above described sequence, each one of the radio terminal 201 and the radio terminal 202 maintains a correspondence between the AV data transferred and the L2CAP logical channels as follows.

Parts (a) and (b) of FIG. 15 show exemplary correspondence tables for the AV data and the L2CAP logical channels maintained by the radio terminal 201 and the radio terminal 202. The correspondence tables of FIG. 15 are basically similar to those of FIG. 3 and FIG. 4, but as the AV data to be transferred to each radio terminal, it is described that MPEG4 video/audio data multiplexed by the H.223 protocol are transferred by the RTP stream, and the control information for the transfer control of these AV data is transferred by the RTCP stream.

In the following, a more specific L2CAP logical channel set up (assignment) scheme in the case of carrying out the AV data transfer between the radio terminal 201 and the radio terminal 202 by utilizing the protocols, the radio network configuration and the correspondence tables as described above will be described.

Figure 16:
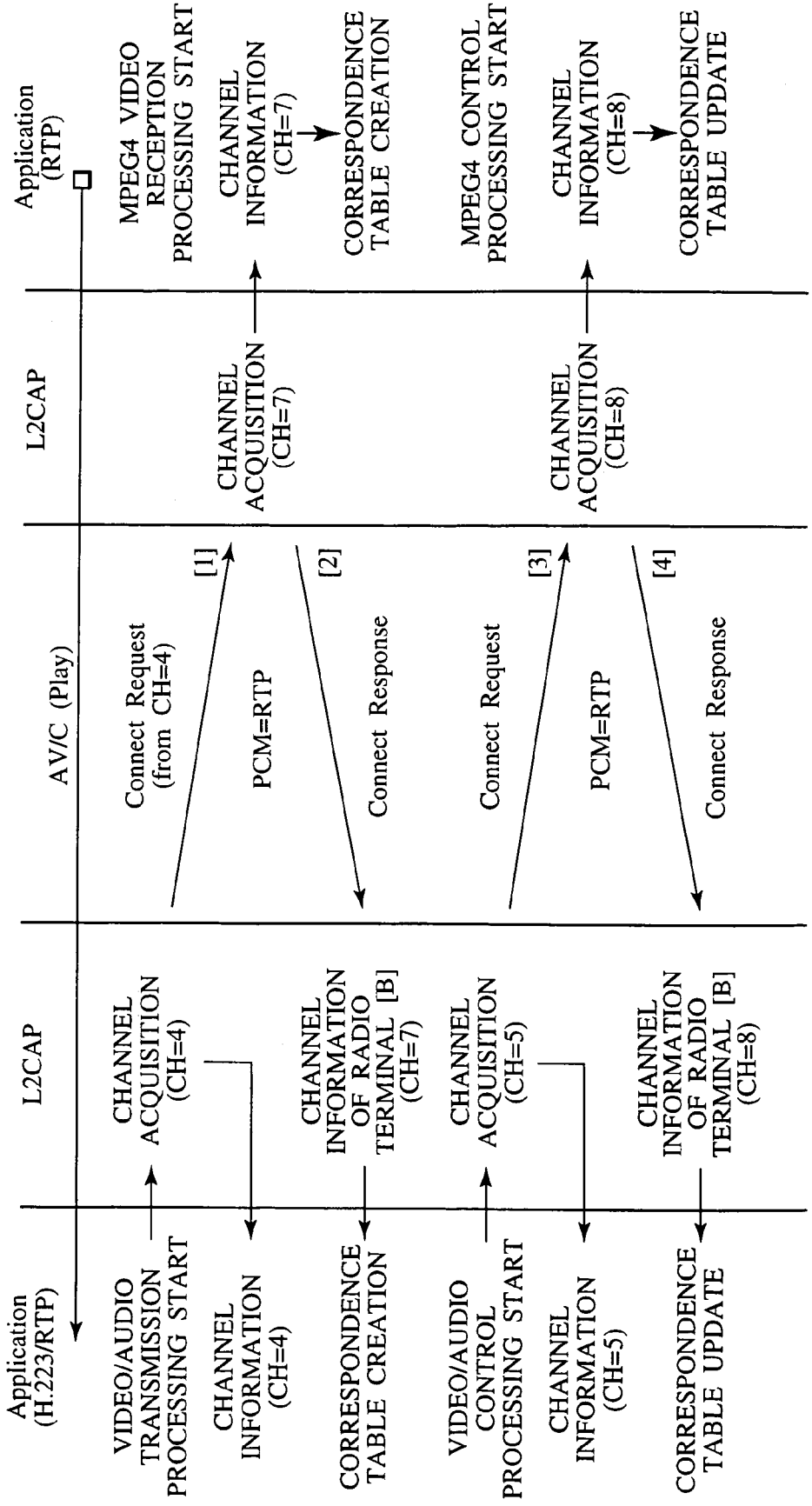
FIG. 16 is a sequence chart showing a first part of one exemplary processing sequence for a logical channel set up at a time of AV data transfer between radio terminals according to the second embodiment of the present invention.
Figure 17:
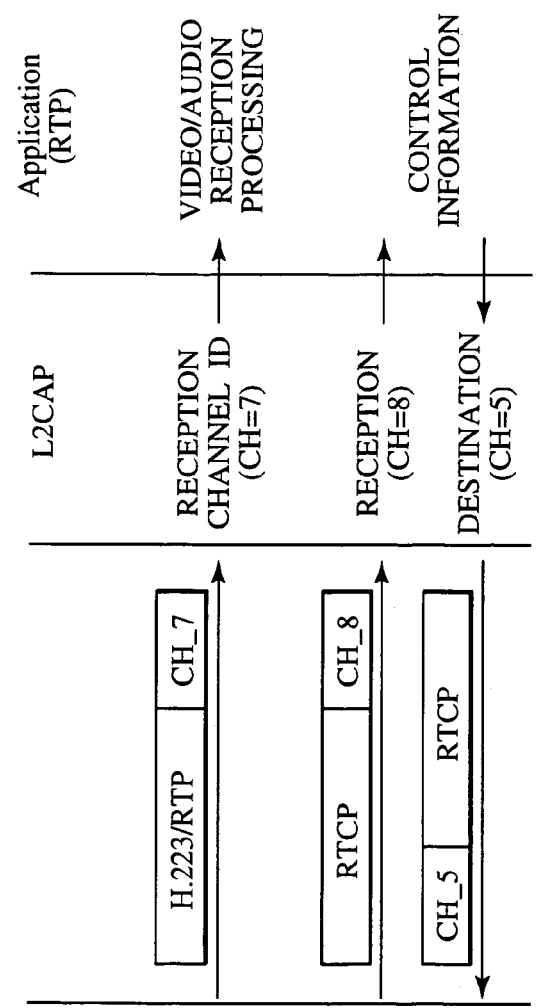
FIG. 17 is a sequence chart showing a second part of one exemplary processing sequence for a logical channel set up at a time of AV data transfer between radio terminals according to the second embodiment of the present invention.

FIG. 16 and FIG. 17 show an exemplary processing sequence in this case. Note that FIG. 16 and FIG. 17 are showing one series of processing in which the processing of FIG. 16 is to be followed by the processing of FIG. 17. Note however that various procedures can be carried out simultaneously or interchanged according to the need as will be described below. Note also that FIG. 16 shows the processing starting from the MPEG4 video data transmission processing (so that the processings corresponding to the procedures (1) and (2) of FIG. 14 are omitted here).

More specifically, this processing sequence proceeds as follows.

The radio terminal 202 transmits the Play command to the radio terminal 201 by using the AV/C protocol, so as to request transfer of the MPEG4 video/audio data.

The radio terminal 201 starts the transmission processing for the MPEG4 video data, the MPEG4 audio data, and the control information.

The radio terminal 201 carries out the processing for acquiring the L2CAP logical channel for the MPEG4 video/audio transfer.

(1) The radio channel 201 sets up the own terminal channel number (which is assumed to be CH=4), and notifies the channel number (CH=4) that is set up to the AV application.

(2) The radio terminal 201 transmits a Connect_Request packet (packet [1] in FIG. 16) in order to acquire the channel number of the radio terminal 202.

(3) Upon receiving the Connect_Request packet, the radio terminal 202 sets up the own terminal channel number (which is assumed to be CH=7), and notifies the channel number (CH=4) of the radio terminal 201 as described in the received Connect_Request packet and the own terminal channel number (CH=7) that is set up to the AV application.

(4) The radio terminal 202 creates the correspondence table of channels for the transfer processing of the MPEG4 video/audio data and the control information.

(5) The radio terminal 202 transmits a Connect_Response packet (packet [2] in FIG. 16) in order to notify the channel number that is set up to the radio terminal 201.

(6) Upon receiving the Connect_Response packet, the radio terminal 201 notifies the channel number (CH=4) of the radio terminal 202 as described in the Connect_Response packet to the AV application.

(7) The radio terminal 201 creates the correspondence table of channels for the transfer processing of the MPEG4 video/audio data and the control information.

The radio terminal 201 carries out the processing for acquiring the L2CAP logical channel for the MPEG4 video/audio transfer control.

The processings similar to the procedures (1) to (7) described above are carried out to set up the channel number (which is assumed to be CH=5) on the radio terminal 201 side and the channel number (which is assumed to be CH=8) on the radio terminal 202 side.

In these processings, the radio terminal 201 transmits the Connect_Request packet (packet [3] in FIG. 16) and the radio terminal 202 transmits the Connect_Response packet (packet [4] in FIG. 16).

Also, each one of the radio terminals 201 and 202 updates the correspondence table of channels for the transfer processing of the MPEG4 video/audio data and the control information.

This completes the logical channel set up and the channel correspondence table set up.

Hereafter, the necessary data communication can be carried out according to the need (the destination logical channels corresponding to the data to be transmitted (the H.223 data and the control information in this example) can be obtained by referring to the channel correspondence table), as follows.

The radio terminal 201 transmits the H.223 data in which the MPEG4 video data and the MPEG4 audio data are multiplexed by the H.223 protocol by encapsulating them into RTP packets, and writing the destination logical channel (CH=7) therein, toward the radio terminal 202.

The radio terminal 201 transmits the control information for the MPEG4 video/audio data transfer control by writing the destination logical channel (CH=8) therein, toward the radio terminal 202.

The radio terminal 202 transmits the control information for the MPEG4 video/audio data transfer control by writing the destination logical channel (CH=5) therein, toward the radio terminal 201.

By carrying out such a series of processing, it becomes possible to realize the transfer of the MPEG4 video/audio data from the radio terminal 201 to the radio terminal 202 (and the exchange of the control information for that purpose).

Note that the exemplary processing sequence described above sequentially carries out the set up of the two L2CAP logical channels, but there is no need to carry out these processings for acquiring the L2CAP logical channels in this order. For example, the processings for acquiring these two logical channels may be carried out in parallel, or the order for carrying out these processings may be interchanged.

Note also that, similarly as in the first embodiment, it is possible to use a method different from that of the above described processing sequence in which the radio terminal 202 does not create the correspondence table and the information on the L2CAP logical channels that are set up (the session information) is notified to the radio terminal 201 from the radio terminal 201 by using the AV/C protocol after the above described series of L2CAP logical channel set up processing is finished.

Note also that, even in this embodiment, there are various methods available for the assignment of the L2CAP logical channels similarly as in the first embodiment.

Figure 18:
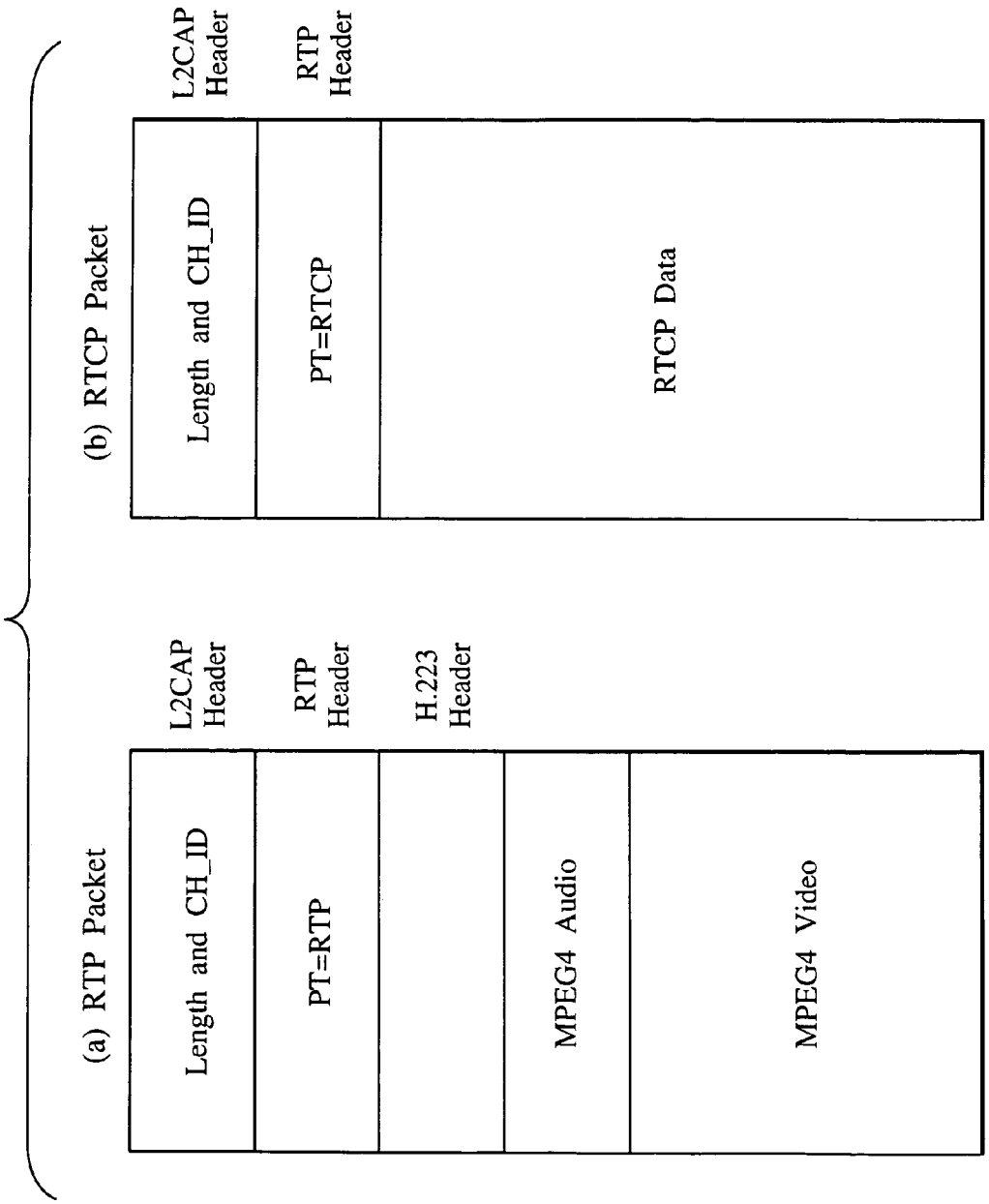
FIG. 18 is a diagram showing exemplary packet formats of an RTP packet and an RTCP packet to be transferred between radio terminals according to the second embodiment of the present invention.

A part (a) of FIG. 18 shows an exemplary packet format for the L2CAP packet for transferring the RTP packets to be transferred by the logical channel (CH=4, 7) and a part (b) of FIG. 18 shows an exemplary packet format for the L2CAP packet for transferring the RTCP packets to be transferred by the logical channel (CH=5, 8), in the procedure of FIG. 16 and FIG. 17.

The packet formats shown in FIG. 18 differ from those shown in FIG. 7 in that an H.223 header region is provided in the payload section of the RTP packet, and that the MPEG4 video data and audio data are loaded in the multiplexed form.

Note that FIG. 18 shows the case where one H.223 packet multiplexing the MPEG4 video/audio data is loaded on one RTP packet, but it is also possible to use an encapsulation method in which one H.223 packet is transferred by being divided into a plurality of RTP packet, or an encapsulation method in which a plurality of H.223 packets are transferred by being multiplexed into one RTP packet.

Note also that the scheme for multiplexing AV streams as described above in this embodiment is not limited to the H.223 protocol. The important point in this embodiment lies in that the AV streams that are multiplexed by some multiplexing protocol are transferred after being encapsulated into the RTP packets.

Third Embodiment

Figure 19:
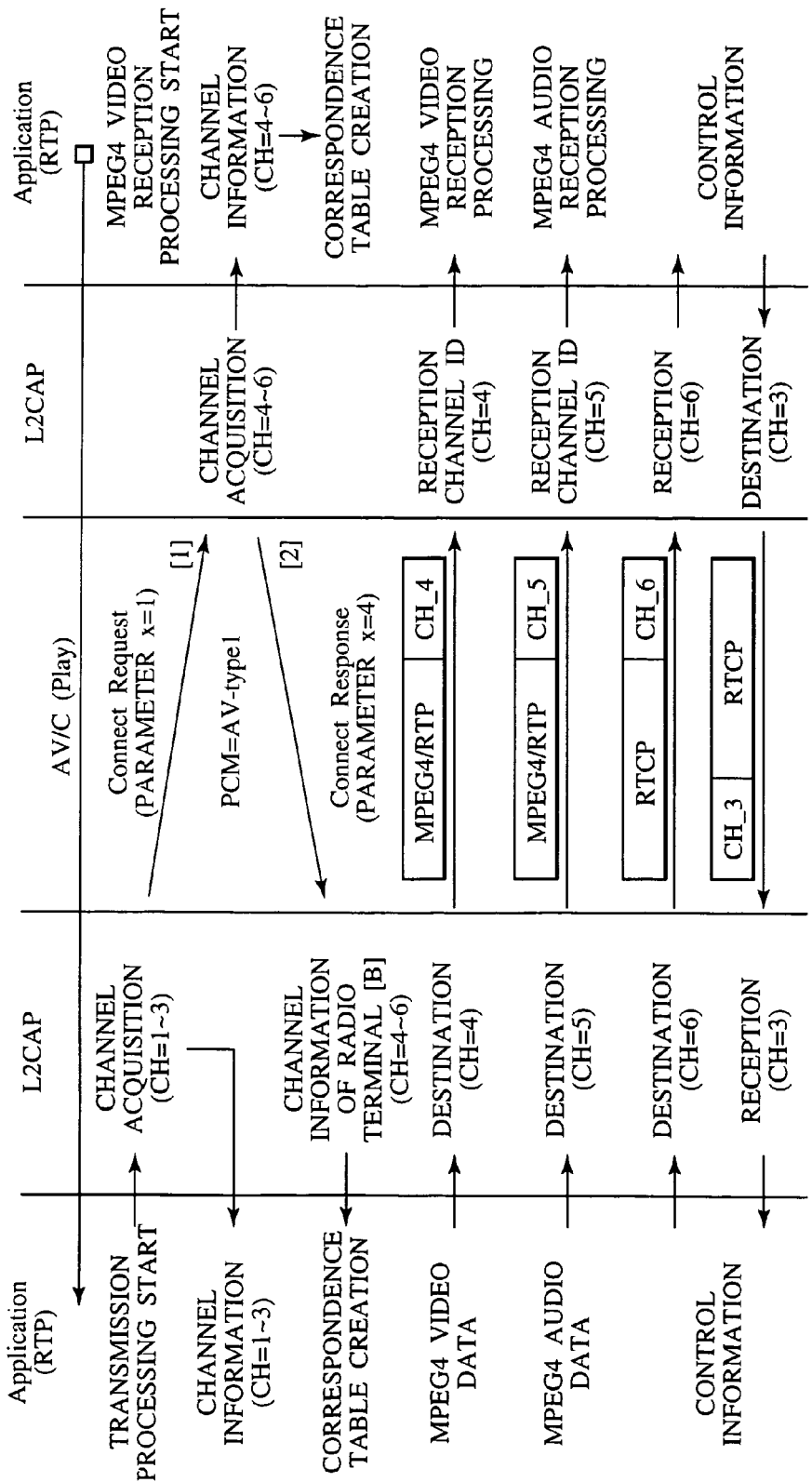
FIG. 19 is a sequence chart showing an exemplary processing sequence for a logical channel set up at a time of AV data transfer between radio terminals according to the third embodiment of the present invention.

Referring now to FIG. 19, the third embodiment of the radio terminal and the data transfer method according to the present invention will be described in detail.

Up to this point, the case of setting up one logical channel by one Connect_request has been mainly described, but in the following, an L2CAP logical channel set up (assignment) scheme in the case of setting up all logical channels for the AV stream transfer and the control information packet transfer by one Connect_Request by determining the logical channel assignment method in advance using each method described above will be described.

First, an example of the logical channel assignment method and information to be notified between the radio terminals in this case will be described.

One possible way of specifying set up of all logical channels related to the data communication on one radio terminal is to use a protocol identifier (PSM) and one parameter value x (in which case, the protocol identifier and the one parameter value x will be notified from the one radio terminal to another radio terminal).

More specifically, in the case of transferring a whole or a part of the video data, the audio data and the control information, for example, any of AV-type1 to AV-type6 can be set as the protocol identifier, where:

AV-type1 indicates video data (RTP)+audio data (RTP)+ control information (RTCP) (which implies that three logical channels for the video data, the audio data and the control information should be set up, and the acquired logical channels f1(x), f2(x) and f3(x) should be assigned to the video data, the audio data and the control information in this order (although of course the order is not necessarily limited to this and can be predetermined in any suitable order), and the similar explanation also applies to the following);

AV-type2 indicates video data (RTP)+control information (RTCP);

AV-type3 indicates audio data (RTP)+control information (RTCP);

AV-type4 indicates video data (RTCP)+audio data (RTP);

AV-type5 indicates video data (RTP); and

AV-type6 indicates audio data (RTP).

Then, for the protocol identifier=AV-type1, provided that the logical channels of the numbers indicated by predetermined functions f1(x), f2(x) and f3(x) of some parameter x (f1(x)=x, f2(x)=x+1 and f3(x)=x+2, for example) can be acquired, the logical channel numbers f1(x), f2(x) and f3(x) are assigned in this order (to the video data, the audio data and the control information in this order, for example).

Similarly, for the protocol identifier=AV-type2, provided that the logical channels of the numbers indicated by predetermined functions f1(x) and f2(x) of some parameter x can be acquired, the logical channel numbers f1(x) and f2(x) are assigned to the video data and the control information in this order. Also, for AV-type3, the logical channel numbers f1(x) and f2(x) that can be acquired are assigned to the audio data and the control information in this order. The other cases are also similarly handled.

By defining the protocol identifier and one parameter value x in this way, it becomes possible to set up all logical channels for the AV stream transfer and the control information packet transfer by one Connect_Request.

It is of course possible to use a method other than the specific example described above.

In the following, the exemplary case of FIG. 5 and FIG. 6 will be described. Of course the other methods described so far can be used similarly.

FIG. 19 shows an exemplary processing sequence in thee case of setting up all logical channels by one Connect_Request which is based on the case of FIG. 5 and FIG. 6. Note that FIG. 19 shows the processing starting from the MPEG4 video data transmission processing (so that the processings corresponding to the procedures (1) and (2) of FIG. 2 are omitted here).

More specifically, this processing sequence proceeds as follows.

The radio terminal 102 transmits the Play command to the radio terminal 101 by using the AV/C protocol, so as to request transfer of the MPEG4 video/audio data.

The radio terminal 101 starts the transmission processing for the MPEG4 video data, the MPEG4 audio data, and the control information.

The radio terminal 101 and the radio terminal 102 carry out the processing for acquiring all the necessary L2CAP logical channels.

(1) The radio channel 101 sets up all the own terminal channel numbers using the predetermined method. Here, it is assumed that, in the case of setting up three logical channels for the MPEG4 video data (RTP), the MPEG4 audio data (RTP) and the control information (RTCP), a method for setting up CH=x, CH=x+1 and CH=x+2 for some parameter x is adopted (and it is assumed that CH=1 corresponds to the MPEG4 video data, CH=2 corresponds to the MPEG4 audio data, and CH=3 corresponds to the control information).

Also, the radio terminal 101 notifies the channel numbers that are set up to the AV application in such a way that the above described correspondence is recognizable.

(2) The radio terminal 101 transmits a Connect_Request packet (packet [1] in FIG. 19) in order to acquire the channel numbers of the radio terminal 102. At this point, AV-type1 as the protocol identifier and x=1 as the parameter information are described according to the example described above.

The parameter x=1 at this point can be notified by using a value of the source channel ID (source CID) of the Connect_Request packet [1]. In this way, it is possible to notify that the top of the series of channel numbers on the radio terminal 101 side is CH=1.

(3) Upon receiving the Connect_Request packet, the radio terminal 102 obtains the above described correspondence at the radio terminal 101 from the protocol identifier and the parameter information described in the Connect_Request packet received from the radio terminal 101.

Also, it is assumed that the radio terminal 102 sets up the own terminal channel numbers similarly as described above. Here, it is assumed that CH=4, 5 and 6 are set up.

Also, the radio terminal 102 notifies the correspondence between the channel numbers set up at the radio terminal 101 and various data, as well as the correspondence between the channel numbers set up at the own terminal and various data to the AV application.

(4) The radio terminal 102 creates the correspondence table of channels for the transfer processing of the MPEG4 video/audio data and and the control information.

(5) The radio terminal 102 transmits a Connect_Response packet (packet [2] in FIG. 19) in order to notify the channel numbers that are set up to the radio terminal 101. At this point, the protocol identifier (PSM=AV-type1) and the parameter information (x=4) are described similarly as described above.

The parameter x=4 at this point can be notified by using a value of the source channel ID (source CID) of the Connect_Response packet [2]. In this way, it is possible to notify that the top of the series of channel numbers on the radio terminal 102 side is CH=4.

(6) Upon receiving the Connect_Response packet, the radio terminal 101 obtains the above described correspondence at the radio terminal 102 from the protocol identifier and the parameter information described in the Connect_Response packet received from the radio terminal 102.

Also, the radio terminal 101 notifies the correspondence between the channel numbers set up at the radio terminal 102 and various data to the AV application.

(7) The radio terminal 101 creates the correspondence table of channels for the transfer processing of the MPEG4 video/audio data and the control information.

This completes the logical channel set up and the channel correspondence table set up.

Hereafter, the necessary data communication can be carried out according to the need (the destination logical channels corresponding to the data to be transmitted (the MPEG4 video data, the MPEG4 audio data, and the control information in this example) can be obtained by referring to the channel correspondence table), as follows.

The radio terminal 101 transmits the MPEG4 video data by writing the destination logical channel (CH=4) therein, toward the radio terminal 102.

The radio terminal 101 transmits the MPEG4 audio data by writing the destination logical channel (CH=5) therein, toward the radio terminal 102.

The radio terminal 101 transmits the control information for the MPEG4 video/audio data transfer control by writing the destination logical channel (CH=6) therein, toward the radio terminal 102.

The radio terminal 102 transmits the control information for the MPEG4 video/audio data transfer control by writing the destination logical channel (CH=3) therein, toward the radio terminal 101.

Note that, the above described specific example is directed to the case where a group of functions for specifying the logical channel numbers from the parameter x are predetermined, but it is also possible to provide a plurality of function groups and notify which function group should be used also as the parameter.

It is also possible to notify the function group to be utilized at a time of the session control processing that is executed prior to the actual data transfer processing.

As described in the above embodiments, according to the present invention, it becomes possible to realize the AV data transfer processing utilizing the transport layer protocol such as RTP protocol, even in the case of utilizing a radio system which starts the data transfer after establishing a logical connection in advance such as Bluetooth.

Also, by assigning different logical channels to the RTP protocol and the RTCP protocol, it becomes possible to make the AV data transfer control processing (in particular, the control processing across the Internet and the radio system) easier.

It is to be noted that the embodiments described above are directed to the case of transferring the video data and the audio data, but the present invention is also applicable to the case of transferring the other information in addition to the video data and the audio data, the case of transferring only the video data, the case of transferring only the audio data, the case of transferring one of the video data and the audio data and the other information, etc.

Also, the above described embodiments are directed to the case of using the unidirectional communication for the AV data, but the present invention is also applicable to the case of using the bidirectional communication for the AV data.

Also, the above described embodiments are directed to the case where the AV data transmitting side transmits the Connect_Request packet after receiving the playback request, and the AV data receiving side transmits the Connect_Response packet in response to that, but it is also possible to adopt the scheme in which the AV data transmitting side transmits a reception request, the AV data receiving side transmits the Connect_Request packet after receiving the reception request, and the AV data transmitting side transmits the Connect_Response packet in response to that.

Also, the configuration described above is applicable not only to a radio terminal but also to a radio gateway for connecting the Internet and the radio network, for example.

Also, the above described embodiments are directed to the exemplary case of using the Bluetooth, but the present invention is also applicable to radio terminals of any other radio LAN system for carrying out data transfer after establishing a logical connection between radio terminals prior to data transfer between radio terminals.

Also, the above described embodiments are directed to the exemplary case of using the AV/C protocol as the AV control protocol for the AV data transfer, but the present invention is also applicable to the case of using any other AV control protocol.

Also, the above described embodiments are directed to the exemplary case of using the RTP protocol (RTCP protocol) as a protocol for transferring the AV data and their control information, but the present invention is also applicable to the case of using any other protocol for transferring the AV data transfer control information.

Also, the above described embodiments are directed to the case of using the H.223 protocol for the purpose of multiplexing the AV data, but the present invention is also applicable to the case of using any other multiplexing protocol.

Also, the present invention is equally applicable to a home network and a network provided in an office or any other environment.

Figure 20:
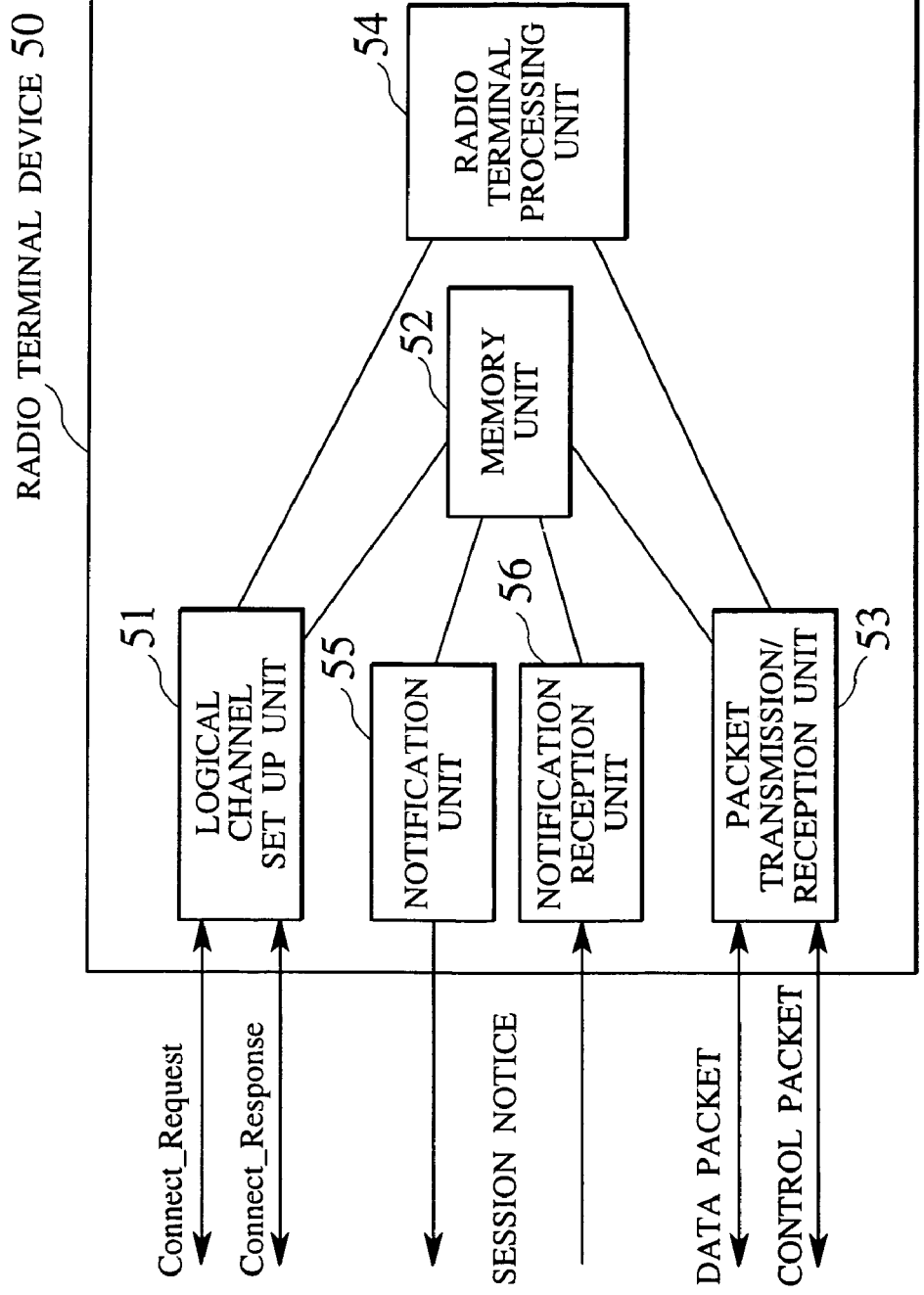
FIG. 20 is a block diagram showing an exemplary configuration of a radio terminal device according to the present invention.

It is to be noted that each radio terminal in the above described embodiments can be realized by a radio terminal device 50 as shown in FIG. 20, for use in a radio system for carrying out data transfer after establishing a logical connection between radio terminals prior to data transfer between radio terminals.

This radio terminal device 50 of FIG. 20 comprises: a logical channel set up unit 51 for setting up at least one first logical channel for transfer of data packets containing at least one AV stream and acquiring information regarding at least one second logical channel set up for the transfer of the data packets at a correspondent radio terminal, and setting up at least one third logical channel for transfer of control packets containing control information regarding transfer of the data packets and acquiring information regarding at least one fourth logical channel set up for the transfer of the control packets at the correspondent radio terminal; a memory unit 52 for storing a correspondence information including a correspondence between the first logical channel and the second logical channel for the AV stream, and a correspondence between the third logical channel and the fourth logical channel for the control information; a packet transmission/reception unit 53 for transmitting/receiving the data packets and the control packets to/from the correspondent radio terminal by using the correspondence information; and a radio terminal processing unit 54 for controlling the logical channel set up unit 51 and the packet transmission/reception unit 53 according to the protocols as described above and carrying out the other processing of the radio terminal.

Here, when the data packets contain a single AV stream or one AV stream in which a plurality of single streams are multiplexed, the logical channel set up unit 51 sets up one first logical channel with respect to the single AV stream or the one AV stream and acquires information regarding one second logical channel set up with respect to the single AV stream or the one AV stream, and sets up one third logical channel with respect to the single AV stream or the one AV stream and acquires information regarding one fourth logical channel set up with respect to the single AV stream or the one AV stream.

On the other hand, when the data packets contain a plurality of AV streams belonging to one AV application, the logical channel set up unit 51 sets up one first logical channel with respect to each one of the plurality of AV streams separately and acquires information regarding one second logical channel set up with respect to each one of the plurality of AV streams separately.

In this case, the logical channel set up unit 51 may set up one third logical channel with respect to the plurality of AV streams and acquire information regarding one fourth logical channel set up with respect to the plurality of AV streams.

Alternatively, the logical channel set up unit 51 may set up one third logical channel with respect to each one of the plurality of AV streams separately and acquires information regarding one fourth logical channel set up with respect to each one of the plurality of AV streams separately.

In the configuration of FIG. 20, the packet transmission/reception unit 53 transmits the data packets by using the second logical channel obtained by referring to the correspondence information, transmits the control packets by using the fourth logical channel obtained by referring to the correspondence information, and receives the control packets from the correspondent radio terminal by using the third logical channel.

When this radio terminal device 50 is an AV data transmitting side radio terminal, the logical channel set up unit 51 can transmit a first connection request containing a channel identifier for identifying the first logical channel set up at the radio terminal device 50 to the correspondent radio terminal, and then receive a first connection response containing a channel identifier for identifying the second logical channel set up at the correspondent radio terminal in response to the first connection request, and transmit a second connection request containing a channel identifier for identifying the third logical channel set up at the radio terminal device 50 to the correspondent radio terminal, and then receive a second connection response containing a channel identifier for identifying the fourth logical channel set up at the correspondent radio terminal in response to the second connection request.

In this case, the logical channel set up unit 51 may acquire the information regarding the second logical channel from the first connection response and the information regarding the fourth logical channel from the second connection response, and register the correspondence information into the memory unit 52 according to the information regarding the second logical channel and the information regarding the fourth logical channel as acquired.

Alternatively, the logical channel set up unit 51 can set up the first logical channel and the third logical channel collectively, and then transmits a connection request containing information for specifying a group of channel identifiers for identifying the first logical channel and the third logical channel set up at the radio terminal device 50 to the correspondent radio terminal.

In this case, the logical channel set up unit 51 may receive a connection response containing information for specifying a group of channel identifiers for identifying the second logical channel and the fourth logical channel set up at the correspondent radio terminal in response to the connection request, and acquires the information regarding the second logical channel and the information regarding the fourth logical channel from the information for specifying the group of identifiers as obtained in the connection response, and registers the correspondence information into the memory unit 52 according to the information regarding the second logical channel and the information regarding the fourth logical channel as acquired.

Here, the information for specifying the group of identifiers can indicate a prescribed parameter value and a group of functions for generating a prescribed number of channel identifiers from the prescribed parameter value, and the group of functions can generate the prescribed number of channel identifiers in forms of consecutive channel numbers.

Alternatively, the logical channel set up unit 51 can notify information for specifying a group of channel identifiers for identifying the first logical channel and the third logical channel to the correspondent radio terminal and then set up the first logical channel and the third logical channel collectively.

When this radio terminal device 50 is an AV data receiving side radio terminal, the logical channel set up unit 51 can receive a first connection request containing a channel identifier for identifying the second logical channel set up at the correspondent radio terminal from the correspondent radio terminal, and then transmit a first connection response containing a channel identifier for identifying the first logical channel set up at the radio terminal device 50 to the correspondent radio terminal in response to the first connection request, and receive a second connection request containing a channel identifier for identifying the fourth logical channel set up at the correspondent radio terminal from the correspondent radio terminal, and then transmit a second connection response containing a channel identifier for identifying the third logical channel set up at the radio terminal device 50 to the correspondent radio terminal in response to the second connection request.

In this case, the logical channel set up unit 51 may acquire the information regarding the second logical channel from the first connection request and the information regarding the fourth logical channel from the second connection request, and register the correspondence information into the memory unit 52 according to the information regarding the second logical channel and the information regarding the fourth logical channel as acquired.

Alternatively, the logical channel set up unit 51 may receive a notification of information for specifying a group of channel identifiers for identifying the first logical channel and the third logical channel from the correspondent radio terminal and then set up the second logical channel and the fourth logical channel collectively.

The radio terminal device 50 of FIG. 20 may further comprises either one or both of a notification unit 55 for notifying the correspondent information stored in the memory unit 52 to the correspondent radio terminal, and a notification reception unit 56 for receiving a notification of the correspondent information obtained at the correspondent radio terminal from the correspondent radio terminal and registering the correspondence information into the memory unit 52 according to the notification.

When the radio system is the Bluetooth, the logical channel set up unit 51 sets up and acquires information on logical channels which are LSCAP channels.

In this radio terminal device 50, the AV stream can be given by data according to an RTP protocol and the control information can be given by data according to an RTCP protocol.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the radio terminal and the radio of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method in a radio system for carrying out data transfer between a radio terminal and another radio terminal after establishing a logical connection between the radio terminal and the another radio terminal, the method comprising the steps of:
   setting up at least one first logical channel for transferring data packets containing at least one AV stream;
   identifying at least one second logical channel set up by the another radio terminal for transferring the data packets;
   setting up at least one third logical channel for transferring a first set of control packets containing first control information regarding transfer of the data packets;
   identifying at least one fourth logical channel set up by the another radio terminal for the transfer of a second set of control packets containing second control information regarding transfer of the data packets;
   storing a correspondence information including a correspondence between the at least one first logical channel and the at least one second logical channel for the at least one AV stream and a correspondence between the at least one third logical channel and the at least one fourth logical channel for the first and second control information; and
   transmitting/receiving the data packets and the first set and second set of control packets between the radio terminal and the another radio terminal by using the correspondence information.

2. The method of claim 1, wherein the at least one AV stream includes a single AV stream or one AV stream in which a plurality of single streams are multiplexed, and the setting up at least one first logical channel comprises:
   setting up one first logical channel with respect to the single AV stream or the one AV stream;
   identifying one second logical channel set up by the another radio terminal with respect to the single AV stream or the one AV stream;
   setting up one third logical channel with respect to the single AV stream or the one AV stream; and
   identifying one fourth logical channel set up by the another radio terminal with respect to the single AV stream or the one AV stream.

3. The method of claim 1, wherein the at least one AV stream includes a plurality of AV streams belonging to one AV application, and the setting up at least one first logical channel comprises:
   setting up one first logical channel with respect to each one of the plurality of AV streams separately; and
   identifying one second logical channel set up by the another radio terminal with respect to each one of the plurality of AV streams separately.

4. The method of claim 3, further comprising:
   setting up one third logical channel with respect to the plurality of AV streams; and
   identifying one fourth logical channel set up by the another radio terminal with respect to the plurality of AV streams.

5. The method of claim 3, further comprising:
   setting up one third logical channel with respect to each one of the plurality of AV streams separately; and
   identifying one fourth logical channel set up by the another radio terminal with respect to each one of the plurality of AV streams separately.

6. The method of claim 1, wherein the transmitting/receiving the data packets comprises:
   transmitting the data packets by using the at least one second logical channel.

7. The method of claim 1, wherein the transmitting/receiving the data packets comprises:
   transmitting the second set of control packets by using the at least one fourth logical channel.

8. The method of claim 1, wherein the transmitting/receiving the data packets comprises:
   receiving the first set of control packets from the another radio terminal by using the at least one third logical channel.

9. The method of claim 1, further comprising:
   transmitting a first connection request containing a first channel identifier for identifying the at least one first logical channel set up by the radio terminal to the another radio terminal, and then receiving a first connection response containing a second channel identifier for identifying the at least one second logical channel set up by the another radio terminal in response to the first connection request; and
   transmitting a second connection request containing a third channel identifier for identifying the at least one third logical channel set up by the radio terminal to the another radio terminal, and then receiving a second connection response containing a fourth channel identifier for identifying the at least one fourth logical channel set up by the another radio terminal in response to the second connection request.

10. The method of claim 9, further comprising:
    identifying the at least one second logical channel based on the first connection response and the at least one fourth logical channel based on the second connection response; and
    storing the correspondence information on the memory unit according to the second logical channel and the fourth logical channel.

11. The method of claim 1, further comprising:
    setting up collectively the at least one first logical channel and the at least one third logical channel; and
    transmitting a connection request containing first information for identifying the at least one first logical channel and the at least one third logical channel set up by the radio terminal to the another radio terminal.

12. The method of claim 11, further comprising:
    receiving a connection response containing second information for identifying the at least one second logical channel and the at least one fourth logical channel set up by the another radio terminal in response to the connection request.

13. The method of claim 12, wherein the storing correspondence information comprises:
    storing the correspondence information on the memory unit according to the second information for identifying the at least one second logical channel and the at least one fourth logical channel set up at by the another radio terminal.

14. The method of claim 11, wherein the first information indicates a prescribed parameter value and a group of functions for generating a prescribed number of channel identifiers from the prescribed parameter value.

15. The method of claim 14, wherein the group of functions generates the prescribed number of channel identifiers in forms of consecutive channel numbers.

16. The method of claim 1, further comprising:
notifying information for identifying the at least one first logical channel and the at least one third logical channel to the another radio terminal; and
setting up the at least one first logical channel and the at least one third logical channel collectively.

17. The method of claim 1, further comprising:
notifying the correspondence information stored in the memory unit to the another radio terminal.

18. The method of claim 1, further comprising:
receiving a first connection request containing a first channel identifier for identifying the at least one second logical channel set up by the another radio terminal from the another radio terminal and then transmitting a first connection response containing a second channel identifier for identifying the at least one first logical channel set up at the radio terminal to the another radio terminal in response to the first connection request; and
receiving a second connection request containing a third channel identifier for identifying the at least one fourth logical channel set up by the another radio terminal from the another radio terminal, and then transmitting a second connection response containing a fourth channel identifier for identifying the at least one third logical channel set up by the radio terminal to the another radio terminal in response to the second connection request.

19. The method of claim 18, further comprising:
storing the correspondence information on the memory unit according to the first, second, third, and fourth channel identifiers.

20. The method of claim 1, further comprising:
receiving information for identifying the at least one second logical channel and the at least one fourth logical channel from the another radio terminal and then setting up the at least one first logical channel and the at least one third logical channel collectively.

21. The method of claim 1, further comprising:
receiving a notification of second correspondence information obtained at the another radio terminal from the another radio terminal; and
storing the second correspondence information on the memory unit according to the notification.

22. The method of claim 1, wherein the radio system is Bluetooth and the at least first logical, at least second logical, at least third logical, and at least fourth logical channels are L2CAP channels.

23. The method of claim 1, wherein the at least one AV stream is given by data according to an RTP protocol and the first and second control information is given by data according to an RTCP protocol.

* * * * *